US012415895B2

(12) United States Patent
Akuta et al.

(10) Patent No.: US 12,415,895 B2
(45) Date of Patent: Sep. 16, 2025

(54) HYDROGEL AND USES THEREFOR

(71) Applicant: SEKISUI KASEI CO., LTD., Osaka (JP)

(72) Inventors: Ryo Akuta, Osaka (JP); Koichiro Okamoto, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 867 days.

(21) Appl. No.: 17/262,990

(22) PCT Filed: Aug. 28, 2019

(86) PCT No.: PCT/IB2019/057225
§ 371 (c)(1),
(2) Date: Jan. 25, 2021

(87) PCT Pub. No.: WO2020/044246
PCT Pub. Date: Mar. 5, 2020

(65) Prior Publication Data
US 2021/0163694 A1    Jun. 3, 2021

(30) Foreign Application Priority Data

Aug. 31, 2018 (JP) ................. 2018-163485
Sep. 10, 2018 (JP) ................. 2018-168757
Mar. 4, 2019 (JP) ................. 2019-038620

(51) Int. Cl.
*C08J 3/075* (2006.01)
*C08F 20/54* (2006.01)
*C08F 220/06* (2006.01)
*C08L 101/14* (2006.01)
*H01M 10/0565* (2010.01)

(52) U.S. Cl.
CPC ............. *C08J 3/075* (2013.01); *C08F 20/54* (2013.01); *C08F 220/06* (2013.01); *C08L 101/14* (2013.01); *H01M 10/0565* (2013.01)

(58) Field of Classification Search
CPC ......... C08J 3/075; C08F 20/54; C08F 220/06; C08L 101/14; H01M 10/0565
See application file for complete search history.

(56) References Cited

U.S. PATENT DOCUMENTS

| | | | |
|---|---|---|---|
| 6,585,873 B1 | 7/2003 | Solomon et al. | |
| 9,175,195 B2 | 11/2015 | Sato et al. | |
| 10,836,854 B2 | 11/2020 | Fonnum et al. | |
| 2003/0027965 A1 | 2/2003 | Solomon et al. | |
| 2006/0258788 A1 | 11/2006 | Coggins et al. | |
| 2012/0028164 A1 | 2/2012 | Lee et al. | |
| 2012/0095131 A1 | 4/2012 | Kinoshita et al. | |
| 2013/0289157 A1 | 10/2013 | Sato et al. | |
| 2014/0296418 A1 | 10/2014 | Sato et al. | |
| 2016/0123865 A1 | 5/2016 | Clare et al. | |
| 2017/0015881 A1 | 1/2017 | Tanaka | |
| 2018/0163004 A1 | 6/2018 | Nishiumi et al. | |

FOREIGN PATENT DOCUMENTS

| | | |
|---|---|---|
| CN | 1865341 A | 11/2006 |
| CN | 102439769 A | 5/2012 |
| CN | 107849363 A | 3/2018 |
| CN | 108026217 A | 5/2018 |
| EP | 0 085 327 A1 | 8/1983 |
| JP | 2005-322635 A | 11/2005 |
| JP | 2012-33490 A | 2/2012 |
| JP | 2013-185119 A | 9/2013 |
| JP | 2015-95286 A | 5/2015 |
| JP | 2017-179328 A | 10/2017 |
| JP | 2017-183204 A | 10/2017 |
| KR | 10-2006-0117269 A | 11/2006 |
| KR | 10-2013-0119961 A | 11/2013 |
| KR | 10-2018-0018737 A | 2/2018 |
| WO | WO-03087170 A1 * 10/2003 ............. C08F 6/006 |
| WO | WO 2015/146840 A1 | 10/2015 |
| WO | WO 2016/031709 A1 | 3/2016 |
| WO | WO 2017/051734 A1 | 3/2017 |

OTHER PUBLICATIONS

Notice of Allowance issued in Korean Patent Application No. 10-2021-7002817 dated Dec. 28, 2022 and English translation thereof.
ISR for PCT/IB2019/057225, dated Nov. 26, 2019 (w/ translation).
Written Opinion for PCT/IB2019/057225, dated Nov. 26, 2019 (w/ translation).
Office Action for KR App. No. 10-2021-7002817, dated Jun. 28, 2022 (w/ translation).
Supplementary Partial ESR for EP App. No. 19854865.3, dated Apr. 7, 2022.
Office Action for CN App. No. 201980051666.0, dated Apr. 24, 2022 (w/English summary).
Office Action issued in the corresponding Chinese Patent Application No. 201980051666.0 dated Mar. 23, 2023 along with English translation thereof.
Extended European Search Report for European Patent Application No. 19854865.3 dated Sep. 19, 2022.

(Continued)

*Primary Examiner* — Angela C Scott
(74) *Attorney, Agent, or Firm* — GREENBLUM & BERNSTEIN, P.L.C.

(57) ABSTRACT

The present invention relates to a hydrogel and use thereof. More specifically, the present invention relates to a hydrogel comprising water and a polymer matrix, wherein the polymer matrix comprises a copolymer of a monofunctional monomer having a hydrophilic group and one ethylenic unsaturated group, and a polyfunctional monomer having no ester bond, and having an amide group and 3 to 6 ethylenic unsaturated groups, 40 to 95 parts by mass of the water, and 5 to 60 parts by mass of the polymer matrix are contained in 100 parts by mass of the hydrogel, and the hydrogel shows a swelling degree of 650% or less, when the hydrogel is immersed in a 4M aqueous KOH solution under a temperature of 25° C. for 14 days, and use thereof.

7 Claims, No Drawings

(56) References Cited

OTHER PUBLICATIONS

Office Action issued in Chinese Patent Application No. 201980051666.0 dated Sep. 28, 2022, along with English translation thereof.
England A. H. et al.: "Synthesis and Characterization of Flexible Hydrogel Electrodes for Electrochemical Impedance Measurements of Protective Coatings on Metal Sculptures", Electroanalysis, vol. 26, No. 5, pp. 1059-1067.
Office Action for TW App. No. 108131062, dated May 8, 2020 (w/English summary).
Notice of Allowance for TW App. No. 108131062, dated Sep. 28, 2020 (w/English summary).
Office Action for CN App. No. 201980051666.0, dated Jan. 7, 2022 (w/translation).
Notice of Allowance that issued in Chinese Patent Application No. 201980051666.0, dated Jul. 13, 2023, and English translation thereof.

* cited by examiner

HYDROGEL AND USES THEREFOR

CROSS REFERENCE TO RELATED APPLICATION

This Application is a 371 of PCT/IB2019/057225 filed on Aug. 28, 2019, which, in turn, claimed the priorities of Japanese Patent Application No. 2018-163485 filed on Aug. 31, 2018, Japanese Patent Application No. 2018-168757 filed on Sep. 10, 2018, and Japanese Patent Application No. 2019-038620 filed on Mar. 4, 2019, the contents of which are incorporated herein by reference.

TECHNICAL FIELD

The present invention relates to a hydrogel and use thereof. More particularly, the present invention relates to a hydrogel that can inhibit growth of a dendrite, a hydrogel that can be used even under the environment of a high-concentration aqueous electrolytic solution, and a gel-like electrolyte, a separator, and an alkaline battery, which use these hydrogels.

BACKGROUND TECHNOLOGY

Against a backdrop of growing worldwide interest in the environmental problem in recent years, utilization of renewable energy, transfer from a gasoline vehicle to an electric vehicle, and stream of utilization of a smart grid have been accelerated. Along with such trend, importance of a storage battery (secondary battery) showing high energy density is increasing.

In a metal-air battery utilizing oxygen in the air as a cathode active material, it is not necessary to fill the cathode active material into a battery, and a large amount of an anode active material can be filled into a battery. For that reason, the metal-air battery attracts attention as a next-generation secondary battery having high energy density. As the metal-air battery, a lithium air battery, a zinc air battery, an aluminum air battery, an iron air battery, a magnesium air battery, and the like are known.

However, in the metal-air battery, a cathode part is isolated from the outside with a water-repellent membrane or the like, but it cannot be said that its sealing performance is sufficient, and it has become a problem that the interior of a battery is easily dried due to transpiration of an electrolytic solution from a cathode, a strongly basic electrolytic solution used as an electrolytic solution is leaked, or the like.

Furthermore, among metal-air batteries, since an air battery using an anode, which can generate a dendrite of zinc or lithium or the like, has high theoretical energy density, it attracts attention. However, in the zinc air battery, since when charge and discharge are repeatedly performed, internal short circuit is caused due to a dendrite that is grown on an anode, it is known that there is a problem of a battery life.

In the field of the conventional alkaline secondary batteries, in order to prevent drying and liquid leakage while retaining ionic conductivity, use of a gelled electrolyte as a battery material has been studied. For example, Japanese Unexamined Patent Application, First Publication No. 2005-322635 (Patent Document 1) describes a polymer hydrogel electrolyte for an alkaline battery, in which alkali hydroxide is contained in a polymer composition consisting of polyvinyl alcohol and an anionic crosslinked copolymer. In addition, International Publication WO 2017/051734 (Patent Document 2) and Japanese Unexamined Patent Application, First Publication No. 2017-183204 (Patent Document 3) describe a sheet-like hydrogel composed of a crosslinked body of a polyacrylic acid-based polymer.

In addition, in a secondary battery using an anode that can generate a dendrite such as a zinc secondary battery, as a method of inhibiting internal short circuit due to a dendrite, for example, there is a method described in Japanese Unexamined Patent Application, First Publication No. 2015-095286 (Patent Document 4). Patent Document 4 describes that an anionic conductive membrane using hydrotalcite or the like having a structure in which a hydroxide ion is incorporated between crystal layers is used as a separator. It is stated that since this anionic conductive membrane has a high mechanical strength while retaining hydroxide ionic conductivity, it can inhibit growth of a dendrite.

In addition, in the metal-air battery using lithium, since a lithium ionic conductive solid electrolyte is low in alkali resistance, it is desired that a pH of an electrolytic solution is lowered. Then, in Japanese Unexamined Patent Application, First Publication No. 2012-033490 (Patent Document 5), use of an aqueous electrolytic solution comprising high-concentration lithium halide has been proposed.

DOCUMENTS OF RELATED ART

Patent Documents

Patent Document 1: Japanese Unexamined Patent Application, First Publication No. 2005-322635
Patent Document 2: International Publication WO 2017/051734
Patent Document 3: Japanese Unexamined Patent Application, First Publication No. 2017-183204
Patent Document 4: Japanese Unexamined Patent Application, First Publication No. 2015-095286
Patent Document 5: Japanese Unexamined Patent Application, First Publication No. 2012-033490

SUMMARY OF THE INVENTION

Problem to be Solved by the Invention

The hydrogel described in Patent Document 1 is a hydrogel obtained by mixing an anionic crosslinked copolymer and polyvinyl alcohol, and drying the mixture. For that reason, polymers constituting a skeleton are mutually independent. However, such a hydrogel has a problem that when the hydrogel is made to contain the moisture, it lacks elongation, and becomes brittle.

In addition, since the hydrogel described in Patent Documents 2 and 3 is a sheet-like hydrogel, it is excellent in strength and elongation, and can be used as a separator for a zinc secondary battery. However, in these hydrogels, concerning inhibition of growth of a dendrite, there has been room for improvement.

In addition, since the anionic conductive membrane described in Patent Document 4 has selective ionic conductivity, and is excellent in mechanical strength, it has high performance of inhibiting growth of a dendrite, and can improve cycling characteristics of a zinc secondary battery. However, since a majority of the anionic conductive membrane is composed of a polymer and an inorganic substance, there has been a problem that water retainability and ionic conductivity are low.

For that reason, it has been desired to provide an ionic conductive membrane that is excellent in water retainability and ionic conductivity, and can inhibit growth of a dendrite. (Hereinafter, referred to as a "first problem".)

Furthermore, in the conventional hydrogels, ionization of a functional group binding to a polymer constituting the hydrogel is weakened in the presence of a high-concentration aqueous electrolytic solution as in Patent Document 5, causing reduction in water retainability and reduction in softness and hardening accompanying that. For that reason, there has been a problem that this hydrogel cannot be used in an alkaline secondary battery using a high-concentration electrolytic solution. (Hereinafter, referred to as a "second problem".)

Means for Solving the Problem

In order to solve the above-mentioned first problem, inventors of the present invention have variously studied a monomer for forming a polymer matrix constituting a hydrogel. As a result, it has been found that a polyfunctional monomer having no ester bond and having an amide group improves compactness of a network, physically inhibits growth of a dendrite towards a cathode direction, and thereby, can provide a hydrogel comprising a polymer matrix capable of inhibiting growth of a dendrite, which is excellent in water retainability and ionic conductivity. Meanwhile, for example, in Japanese Unexamined Patent Application, First Publication No. 2017-068933, it is described that in the field of a separator for an alkaline secondary battery, when a polyamide-based non-woven fabric is used as a separator, it generates a decomposition product due to gradual decomposition in an alkaline electrolytic solution, and the decomposition product brings out deterioration in battery properties. That is, in this gazette, it is stated that it is a common technical knowledge that use of a substance having an amide bond as a component of an alkaline secondary battery is not appropriate. However, in spite of such a common technical knowledge, it is extremely unexpected that, in the present invention, a polymer matrix comprising a component derived from a polyfunctional monomer having an amide group can provide an ionic conductive membrane that is excellent in water retainability and ionic conductivity, and can inhibit growth of a dendrite.

Thus, a first aspect of the present invention that solves the above-mentioned first problem provides a hydrogel comprising water and a polymer matrix, wherein the polymer matrix comprises a copolymer of a monofunctional monomer having a hydrophilic group and one ethylenic unsaturated group, and a polyfunctional monomer having no ester bond, and having an amide group and 3 to 6 ethylenic unsaturated groups, 40 to 95 parts by mass of the water, and 5 to 60 parts by mass of the polymer matrix are contained in 100 parts by mass of the hydrogel, and the hydrogel shows a swelling degree of 650% or less, when the hydrogel is immersed in a 4M aqueous KOH solution under a temperature of 25° C. for 14 days.

Furthermore, in order to solve the above-mentioned second problem, the inventors of the present invention have tried inhibition of hardening of a hydrogel under the environment of a high-concentration aqueous electrolytic solution, by introducing a fixed amount of a strongly ionizing functional group (for example, sulfone group) into a skeleton of a polymer matrix constituting a hydrogel. As a result, inhibition to some extent was possible, but hydrophilicity of a skeleton was sometimes enhanced by introduction of a strongly ionizing functional group. Since enhancement of hydrophilicity influences a swelling degree at immersion in an electrolytic solution and the mechanical strength of a hydrogel, there has been room for improvement. Then, as a result of intensive studies, the present inventors have found out that by inclusion of a polyacrylic acid-based polymer having a specific weight average molecular weight in a hydrogel, a hydrogel that can prevent precipitation of a copolymer, can be used even under the environment of a high-concentration aqueous electrolytic solution, and is excellent in mechanical strength can be provided, leading to the present invention.

Thus, a second aspect of the present invention that solves the above-mentioned second problem provides a hydrogel comprising water, a polyacrylic acid-based polymer, and a polymer matrix, wherein the polyacrylic acid-based polymer has a weight average molecular weight of 3,000 to 2,000,000, the polymer matrix comprises a copolymer of a monofunctional monomer having an ethylenic unsaturated group, and a polyfunctional monomer having 2 to 6 ethylenic unsaturated groups, the monofunctional monomer having an ethylenic unsaturated group comprises a monofunctional monomer A having at least one group selected from a sulfone group and a phosphoric acid group, and one ethylenic unsaturated group, a component derived from the monofunctional monomer A and the polyacrylic acid-based polymer exist in the hydrogel at a mass ratio of 100:2.5 to 90, and 21 to 89.5 parts by mass of the water, 0.5 to 19 parts by mass of the polyacrylic acid-based polymer, and 10 to 60 parts by mass of the polymer matrix are contained in 100 parts by mass of the hydrogel.

Furthermore, according to the present invention, there is provided a gel-like electrolyte comprising the hydrogel, and an electrolyte component contained in the hydrogel.

In addition, according to the present invention, there is provided a separator using the hydrogel or the gel-like electrolyte.

Furthermore, according to the present invention, there is provided an alkaline battery comprising any one of the hydrogel, the gel-like electrolyte, and the separator.

Effects of Invention

According to the first aspect of the present invention, by improving compactness of a network, and physically inhibiting growth of a dendrite towards a cathode direction, there can be provided a hydrogel comprising a polymer matrix that can inhibit growth of a dendrite, which is excellent in water retainability and ionic conductivity.

Since the hydrogel according to the first aspect of the present invention can inhibit growth of a dendrite, when used as a gel-like electrolyte and a separator, the number of repeating charge and discharge of an alkaline battery can be increased.

In addition, according to the first aspect of the present invention, when the invention has the following constitution, there can be provided a hydrogel comprising a polymer matrix that can further inhibit growth of a dendrite, which is excellent in water retainability and ionic conductivity.

(1) 3 to 6 ethylenic unsaturated groups in the polyfunctional monomer are included in a divalent group derived from vinylamide represented by the following formula (X).

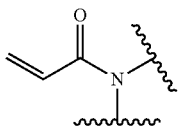

(2) The polyfunctional monomer is a monomer composed of a straight or branched hydrocarbon chain, and in the hydrocarbon chain, a carbon atom constituting the hydrocarbon chain may be replaced with an oxygen atom and/or a nitrogen atom, and the divalent group derived from vinylamide
(i) is positioned at an end of the hydrocarbon chain, as the following formula (X-I):

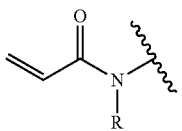

(wherein, R means a hydrogen atom or an alkyl group having 1 to 4 carbon atoms) and/or
(ii) is positioned together with a nitrogen atom replacing a carbon atom of the hydrocarbon chain, as a group represented by the formula (X).

(3) The polyfunctional monomer is a water-soluble monomer having 10 to 40 carbon atoms, and having a melting point of 70 to 150° C.

(4) The copolymer comprises 100 parts by mass of a unit derived from the monofunctional monomer, and 0.1 to 5 parts by mass of a unit derived from the polyfunctional monomer.

(5) When the hydrogel is immersed in a 4M aqueous KOH solution saturated with zinc oxide, and thereafter, is subjected to a direct current polarization test in which a direct current at 1 mA/cm$^2$ is passed between zinc electrode plates, in a state of being positioned between the zinc electrode plates at an interval of 200 μm, the hydrogel shows an energization time of 700 minutes or longer.

(6) When the hydrogel is immersed in a 4M aqueous KOH solution saturated with zinc oxide, and thereafter, is subjected to a direct current polarization test in which a direct current at 1 mA/cm$^2$ is passed between zinc electrode plates, in a state of being positioned between the zinc electrode plates at an interval of 200 μm, the hydrogel shows a voltage of 2.0 to 15 mV per 1 cm$^2$ of a zinc electrode plate, when 40 minutes passed from energization initiation.

Furthermore, according to the second aspect of the present invention, the following effect is exerted:
(i) By introducing a sulfone group and/or a phosphoric acid group into a skeleton of a polymer matrix constituting a hydrogel, precipitation of the skeleton when a large amount of an electrolyte is contained in the hydrogel is prevented, and softness can be retained.
(ii) By containing a polyacrylic acid-based polymer having a weight average molecular weight in a specific range, a high mechanical strength can be imparted to a hydrogel after immersion in an electrolytic solution.

Since the hydrogel according to the second aspect of the present invention shows good adherability to an electrode or a solid electrolyte, from a point that it retains water retainability and softness even under the state where an electrolyte is impregnated at high concentration, it can inhibit increase in an interface resistance with these battery materials, and as a result, can realize better battery properties. Further, the hydrogel according to the second aspect of the present invention is excellent in handleability when used as a gel electrolyte for a battery, from a point that it is excellent in the mechanical strength.

In addition, according to the second aspect of the present invention, when the invention has the following constitution, a hydrogel that is more excellent in handleability and battery properties can be provided.

(1) The monofunctional monomer having an ethylenic unsaturated group further comprises a monofunctional monomer B having a carboxyl group and one ethylenic unsaturated group, and a content ratio of the monofunctional monomers A and B is in a range of 30 mol % or more and 70 mol % or less.

(2) The polyacrylic acid-based polymer is a homopolymer of a carboxyl group-containing monomer, or a copolymer of a carboxyl group-containing monomer and a sulfonic acid group-containing monomer.

(3) The polyacrylic acid-based polymer is a polymer in which an absorbance ratio (absorbance$_{[1040\pm20\ cm-1]}$/absorbance$_{[1650\pm130\ cm-1]}$) of an absorbance of a maximum peak in a range of 1650±130 cm$^{-1}$ (absorbance$_{[1650\pm130\ cm-1]}$) and an absorbance of a maximum peak in a range of 1040±20 cm$^{-1}$ (absorbance$_{[1040\pm20\ cm-1]}$) obtained in FT-IR measurement shows a value in a range of 0.001 to 5.0.

(4) The hydrogel shows a swelling degree of 50 to 300%, when the hydrogel is immersed in an aqueous solution containing 1.5M LiOH and 10M LiCl under a temperature of 25° C. for one week.

(5) The hydrogel shows a piercing strength of 0.35N or more, when the hydrogel is immersed in an aqueous solution containing 1.5M LiOH and 10M LiCl under a temperature of 25° C. for one week.

(6) The hydrogel shows a value of 20Ω or less as an impedance at a frequency of 100 kHz, when the hydrogel is immersed in an aqueous solution containing 1.5M LiOH and 10M LiCl under a temperature of 25° C. for one week.

BEST MODE FOR CARRYING OUT THE INVENTION (Hydrogel According to First Aspect)

It is preferable that a hydrogel according to the first aspect of the present invention shows an energization time of 700 minutes or longer, when the hydrogel is immersed in a 4M aqueous KOH solution saturated with zinc oxide, and thereafter, is subjected to a direct current polarization test in which a direct current at 1 mA/cm$^2$ is passed between zinc electrode plates, in a state of being positioned between zinc electrode plates at an interval of 200 μm. A long energization time means, for example, that a dendrite grown from a zinc plate of an anode hardly reaches a cathode, in other words, that performance of inhibition of short circuit due to a dendrite is excellent. When the energization time is shorter than 700 minutes, short circuit due to a dendrite may not be sufficiently inhibited. The energization time is more preferably 800 minutes or longer, further preferably 900 minutes or longer, particularly preferably 1,000 minutes or longer.

The hydrogel shows a voltage of 2.5 to 15 mV per 1 cm$^2$ of a zinc electrode plate at passage of 40 minutes from energization initiation, when the hydrogel is immersed in a 4M aqueous KOH solution saturated with zinc oxide, and thereafter, is subjected to a direct current polarization test in which a direct current at 1 mA/cm$^2$ is passed between zinc electrode plates, in the state of being positioned between zinc electrode plates at an interval of 200 μm. By showing a voltage in this range, resistance when used as a separator of an alkaline secondary battery can be reduced, and thus battery properties can be improved. A voltage is more preferably 2.5 to 12.5 mV, further preferably 2.5 to 10.0 mV.

It is preferable that the hydrogel shows six kinds of measured swelling degrees of 650% or less, when the hydrogel is immersed in a 4M aqueous KOH solution under a temperature of 25° C. or 60° C. for 14 days, 21 days, and 35 days. A low swelling degree means that a network of a skeleton of a polymer matrix constituting the hydrogel is compact, and the inventors consider that as compactness is higher, that is, as a swelling degree is lower, growth of a dendrite can be further inhibited. When the swelling degree is greater than 650%, the strength of the hydrogel may be reduced due to swelling. The swelling degree is more preferably 100 to 650%, further preferably 100 to 600%, particularly preferably 100 to 550%.

It is preferable that the hydrogel shows six kinds of measured piercing strengths of 0.25N or more, when the hydrogel is immersed in a 4M aqueous KOH solution under a temperature of 25° C. or 60° C. for 14 days, 21 days, and 35 days. The piercing strength herein means an average value of a maximum stress until a tip of a jig having a diameter of 3 mm penetrates the hydrogel. When the piercing strength is less than 0.25N, the mechanical strength becomes low, and the hydrogel may not be handled as a self-standing membrane. The piercing strength is more preferably 0.25 to 20.0N.

It is preferable that the hydrogel has a thickness of 10 to 3,000 μm. When the thickness is less than 10 μm, in cases where a battery is assembled, when a cathode, the hydrogel, and an anode are laminated, and are pressed after lamination, a convex part on a cathode or an anode may break through the hydrogel, and cause short circuit. When the thickness is greater than 3,000 μm, resistance between electrodes increases, and battery properties when the hydrogel is used as a battery material may be deteriorated. The thickness is preferable, in the following descending order of 10 to 2,000 μm, 20 to 1,000 μm, 20 to 750 μm, 20 to 550 μm, 20 to 450 μm, 20 to 400 μm, 20 to 350 μm, 30 to 350 μm, and 30 to 300 μm.

The hydrogel according to the first aspect of the present invention comprises water and a polymer matrix.

(1) Polymer Matrix

A polymer matrix contained in the hydrogel according to the first aspect of the present invention comprises a copolymer of a monofunctional monomer having a hydrophilic group and one ethylenic unsaturated group, and a polyfunctional monomer having no ester bond, and having an amide group and 3 to 6 ethylenic unsaturated groups. This copolymer can be formed by polymerizing and crosslinking various monomers.

The polymer matrix is contained at 5 to 60 parts by mass in 100 parts by mass of the hydrogel. When the content is less than 5 parts by mass, the strength of the hydrogel becomes low, and a sheet shape may not be retained. When the content is more than 60 parts by mass, since movement of ions is inhibited, resistance may become high. The content is preferably 5 to 50 parts by mass, more preferably 10 to 40 parts by mass.

In addition, the content of the copolymer in the polymer matrix is preferably 45 parts by mass or more, more preferably 55 parts by mass or more. The polymer matrix may be composed only of the copolymer.

(a) Monofunctional Monomer

A monofunctional monomer is not limited, as long as it has a hydrophilic group and one ethylenic unsaturated group. Examples of the hydrophilic group include a carboxyl group, a sulfonic acid group, and the like. Herein, the carboxyl group and the sulfonic acid group also include cases where they exist in the monofunctional monomer in a salt form. Furthermore, the monofunctional monomer may be a mixture of a monomer that is not in a salt form, and a monomer that is in a salt form. For example, examples of the monofunctional monomer include (meth)acrylic acid, sodium (meth)acrylate, potassium (meth)acrylate, lithium (meth)acrylate, vinylbenzoic acid, sodium vinylbenzoate, potassium vinylbenzoate, lithium vinylbenzoate, vinylacetic acid, sodium vinylacetate, potassium vinylacetate, lithium vinylacetate, vinylsulfonic acid, sodium vinylsulfonate, potassium vinylsulfonate, lithium vinylsulfonate, p-styrenesulfonic acid, sodium p-styrenesulfonate, potassium p-styrenesulfonate, lithium p-styrenesulfonate, allylsulfonic acid, sodium allylsulfonate, potassium allylsulfonate, lithium allylsulfonate, 2-acrylamide-2-methylpropanesulfonic acid, sodium 2-acrylamide-2-methylpropanesulfonate, potassium 2-acrylamide-2-methylpropanesulfonate, and lithium 2-acrylamide-2-methylpropanesulfonate.

(b) Polyfunctional Monomer

A polyfunctional monomer has no ester bond, and has an amide group and 3 to 6 ethylenic unsaturated groups. Since this polyfunctional monomer has a role of a crosslinking agent, compactness of a network of a skeleton of the polymer matrix constituting the hydrogel can be improved. The inventors consider that, as a result of this improvement, by physically inhibiting growth of a dendrite towards a cathode direction, internal short circuit due to a dendrite that is generated on an anode can be inhibited. When the number of ethylenic unsaturated groups is 2 or less, performance of inhibiting growth of a dendrite may be deteriorated, by reduction in compactness of a network of a skeleton. When the number is 7 or more, since a high stress is locally applied to the hydrogel, by formation of places where a network has become compact locally in a skeleton, the hydrogel may become brittle. The number of ethylenic unsaturated groups is preferably 3 or 4.

It is preferable that 3 to 6 ethylenic unsaturated groups in the polyfunctional monomer are included in a divalent group derived from vinylamide represented by the following formula (X).

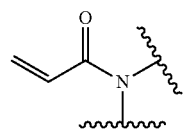

(X)

By using the polyfunctional monomer having a divalent group derived from vinylamide, reactivity between the monofunctional monomer forming a main skeleton of the polymer matrix, and the polyfunctional monomer can be improved. As a result, since compactness of a network forming the polymer matrix can be improved, there can be obtained a hydrogel in which performance of inhibiting internal short circuit due to a dendrite is enhanced.

In addition, the polyfunctional monomer is a monomer composed of a straight or branched hydrocarbon chain, and in the hydrocarbon chain, a carbon atom constituting the hydrocarbon chain may be replaced with an oxygen atom and/or a nitrogen atom. Also, it is preferable that a divalent group derived from vinylamide
(i) is positioned at an end of a hydrocarbon chain as the following formula (X-I):

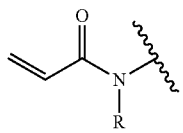

(X-1)

(wherein, R means a hydrogen atom or an alkyl group having 1 to 4 carbon atoms) and/or
(ii) is positioned together with a nitrogen atom replacing a carbon atom of a hydrocarbon chain as a group represented by the formula (X).

In addition, it is preferable that the polyfunctional monomer is a water-soluble monomer having 10 to 40 carbon atoms, and having a melting point of 70 to 150° C.

Examples of a specific polyfunctional monomer include N, N'-{[(2-acrylamide-2-[(3-acrylamidopropoxy)methyl]propan-1,3-diyl)bis(oxy)]bis(propan-1,3-diyl)}diacrylamide (CAS No. 1393329-90-2), N,N',N''-triacryloyldiethylenetriamine (CAS No. 34330-10-4), N,N',N'',N'''-tetraacryloyltriethylenetetramine (CAS No. 158749-66-7), and the like.

The polyfunctional monomer may be only one kind, or may be a mixture of plural species.

It is preferable that a unit derived from the polyfunctional monomer is contained at a ratio of 0.1 to 5 parts by mass, based on 100 parts by mass of a unit derived from the monofunctional monomer. When a ratio of the unit derived from the polyfunctional monomer is less than 0.1 part by mass, the crosslinking density may become low. When the ratio is more than 5 parts by mass, the unit derived from the polyfunctional monomer may phase-separate, becoming a hydrogel in which a crosslinked structure is non-uniform. The ratio is preferably 0.2 to 4.5 parts by mass, more preferably 0.4 to 4.0 parts by mass.

In addition, the copolymer contains units derived from the monofunctional monomer and the polyfunctional monomer, and a use amount of each monomer at producing of the copolymer, and the content of each unit in the copolymer are approximately identical. In addition, the content of the unit derived from the polyfunctional monomer in the copolymer can be measured by pyrolysis GC and/or IR.

(c) Other Polymers

Polymers other than the copolymer of the above-mentioned monofunctional monomer and polyfunctional monomer may be contained in the polymer matrix in a form not polymerized with the above-mentioned copolymer, in such a range that the effect of the present invention is not inhibited. Examples of other polymers include a polyvinylsulfonic acid-based polymer, a polyacrylic acid-based polymer, a cellulose derivative, and the like. It is preferable that a ratio of other polymers occupied in 100 parts by mass of the polymer matrix is less than 50 parts by mass.

(2) Water

Water contained in the hydrogel according to the first aspect of the present invention is contained at 40 to 95 parts by mass in 100 parts by mass of the hydrogel. When the content is less than 40 parts by mass, an amount at which an electrolyte component can be contained becomes small, and when used as a gel electrolyte of a battery, an impedance is high, and desired battery properties may not be obtained. When the amount is more than 95 parts by mass, the strength of the hydrogel may become low. The content is more preferably 50 to 90 parts by mass, further preferably 60 to 90 parts by mass.

(3) Electrolyte Component

An electrolyte component may be dissolved in water. The hydrogel containing an electrolyte component can be used as a gel-like electrolyte. Examples of the electrolyte component include sodium hydroxide (NaOH), potassium hydroxide (KOH), calcium hydroxide (Ca(OH)$_2$), barium hydroxide (Ba(OH)$_2$), lithium hydroxide (LiOH), rubidium hydroxide (RbOH), cesium hydroxide (CsOH), lithium fluoride (LiF), lithium chloride (LiCl), lithium bromide (LiBr), lithium iodide (LiI), sodium chloride (NaCl), sodium bromide (NaBr), potassium chloride (KCl), potassium bromide (KBr), calcium chloride (CaCl$_2$), and the like. It is preferable that a dissolved amount of the electrolyte component is 70 parts by mass or less, based on 100 parts by mass of water. When the dissolved amount is more than 70 parts by mass, since the electrolyte concentration becomes too high, an impedance may become high. A preferable dissolved amount is 4 to 70 parts by mass.

(4) Other Components (a) Supporting Material

The hydrogel according to the first aspect of the present invention may contain a supporting material such as a woven fabric, a non-woven fabric, and a porous sheet (hereinafter, also referred to as "intermediate base material"). By containing the supporting material, a shape of the hydrogel can be easily maintained. Examples of the material of the supporting material include natural fibers such as cellulose, silk, and hemp, synthetic fibers such as polyester, nylon, rayon, polyethylene, polypropylene, and polyurethane, and mixed spun fibers thereof. When the electrolyte component is contained, synthetic fibers such as rayon, polyethylene, and polypropylene, which do not have a component that is decomposed by the electrolyte component, and mixed spun fabrics thereof are preferable. The supporting material may be positioned at any of the front surface, the rear surface, and an in-between location of the hydrogel.

When the thickness of the hydrogel is defined as A, and the thickness of the supporting material is defined as B, it is preferable that the supporting material satisfies the relationship of $0.45 \leq B/A < 1$. In cases where B/A is less than 0.45, when the hydrogel is immersed in an electrolytic solution in order to impregnate an electrolyte, winding or warping may be generated, by a difference in swelling between sheet front and rear surfaces, which is generated by uneven distribution in the hydrogel of the supporting material. When B/A is 1 or more, since the supporting material is exposed from the hydrogel front surface, moisture retainability of an electrolytic solution may be reduced, or adherability to an electrode may be reduced. The relationship of B/A is more preferably $0.45 \leq B/A < 1$, further preferably $0.5 \leq B/A < 1$.

(b) Protective Film

The hydrogel according to the first aspect of the present invention may include a protective film on the front surface and/or the rear surface thereof. When the protective film is used as a separator, it is preferably mold release-treated. When the hydrogel includes the protective film on both of the front surface and the rear surface, it may be prepared so that the front surface and the rear surface have different peeling strengths. In addition, when the protective film is used as the supporting material, mold release treatment is not necessary.

Examples of the protective film include films formed of polyester, polyolefin, polystyrene, polyurethane, paper, paper laminated with a resin film (for example, polyethylene film, polypropylene film) or the like. Examples of mold release treatment include baking-type silicone coating in which a crosslinking and curing reaction is performed with heat or an ultraviolet ray.

(c) Additive

The hydrogel according to the first aspect of the present invention may contain an additive, as necessary. Examples of the additive include an electrolyte, an antiseptic, a bactericide, an antifungal agent, a rust-preventive agent, an antioxidant, an anti-foaming agent, a stabilizer, a perfume, a surfactant, a colorant, a gel strength improving agent (for example, cellulose nanofiber), and the like.

(Hydrogel According to Second Aspect)

When the hydrogel according to the second aspect of the present invention is immersed in an aqueous solution containing 1.5M LiOH and 10M LiCl under a temperature of 25° C. for one week, it preferably shows a swelling degree of 50 to 300%. When a swelling degree is less than 50%, an amount of a solid content of the hydrogel becomes too large, and reduction in softness, and according to the circumstances, hardening may be caused. When a swelling degree is greater than 300%, since the mechanical strength of the hydrogel after swelling is low, the hydrogel may be destructed at handling. It is more preferable that a swelling degree is 50 to 280%.

When the hydrogel is immersed in an aqueous solution containing 1.5M LiOH and 10M LiCl under a temperature of 25° C. for one week, it preferably shows the piercing strength of 0.35N or more. The piercing strength herein means an average value of a maximum stress until a tip of a jig having a diameter of 3 mm penetrates the hydrogel. When the piercing strength is less than 0.35N, the mechanical strength becomes low, and the hydrogel may not be handled as a self-standing membrane. It is more preferable that an upper limit of the piercing strength is 300N.

When the hydrogel is immersed in an aqueous solution containing 1.5M LiOH and 10M LiCl under a temperature of 25° C. for one week, it preferably shows a value of 20Ω or less as an impedance at a frequency of 100 kHz. When a value of an impedance is greater than 20Ω, this may bring out deterioration in battery properties due to increase in resistance of an electrolyte. A value of an impedance is more preferably 18Ω or less, further preferably 16Ω or less, particularly preferably 14Ω or less. It is preferable that a lower limit of a value of an impedance is 0.05Ω.

The hydrogel according to the second aspect of the present invention comprises water, a polyacrylic acid-based polymer, and a polymer matrix.

(1) Polymer Matrix

A polymer matrix contained in the hydrogel according to the second aspect of the present invention comprises a copolymer of a monofunctional monomer having an ethylenic unsaturated group, and a polyfunctional monomer having 2 to 6 ethylenic unsaturated groups. This copolymer can be formed by polymerizing and crosslinking various monomers.

The polymer matrix is contained at 10 to 60 parts by mass in 100 parts by mass of the hydrogel. When the content is less than 10 parts by mass, the mechanical strength of the hydrogel becomes low, and a sheet shape may not be retained. When the content is greater than 60 parts by mass, since movement of ions is inhibited, ion resistance may become high. The content is preferably 10 to 55 parts by mass, more preferably 10 to 50 parts by mass.

In addition, the content of the copolymer in the polymer matrix is preferably 45 parts by mass or more, more preferably 55 parts by mass or more. The polymer matrix may be composed only of the copolymer.

(a) Copolymer

A copolymer contains a copolymer of a monofunctional monomer having an ethylenic unsaturated group, and a polyfunctional monomer having 2 to 6 ethylenic unsaturated groups. The monofunctional monomer contains a monofunctional monomer A having at least one group selected from a sulfone group and a phosphoric acid group, and one ethylenic unsaturated group. The copolymer may further contain, as an arbitrary component, a monofunctional monomer B having a carboxyl group or a neutralized functional group thereof, and one ethylenic unsaturated group.

(a-1) Monofunctional Monomer A

A monofunctional monomer A is not particularly limited, as long as it is a monomer having at least one group selected from a sulfone group and a phosphoric acid group, and one ethylenic unsaturated group. Herein, the sulfone group and the phosphoric acid group include cases where they exist in the monofunctional monomer A in a salt form. Further, the monofunctional monomer A may be a mixture of a monomer that is not in a salt form and a monomer that is in a salt form.

For example, examples of the monofunctional monomer A include sulfone group-containing monomers such as vinylsulfonic acid, sodium vinylsulfonate, potassium vinylsulfonate, lithium vinylsulfonate, p-styrenesulfonic acid, sodium p-styrenesulfonate, potassium p-styrenesulfonate, lithium p-styrenesulfonate, allylsulfonic acid, sodium allylsulfonate, potassium allylsulfonate, lithium allylsulfonate, 2-acrylamide-2-methylpropanesulfonic acid, sodium 2-acrylamide-2-methylpropanesulfonate, potassium 2-acrylamide-2-methylpropanesulfonate, and lithium 2-acrylamide-2-methylpropanesulfonate, and phosphoric acid group-containing monomers such as vinylphosphonic acid, sodium vinylphosphonate, potassium vinylphosphonate, lithium vinylphosphonate, diethyl vinylphosphonate, dimethyl vinylphosphonate, phenylvinylphosphonic acid, sodium phenylvinylphosphonate, potassium phenylvinylphosphonate, and lithium phenylvinylphosphonate. By introducing a sulfone group and/or a phosphoric acid group having a high ionization degree into the copolymer, ionization of an ionic functional group when immersed in a high-concentration electrolytic solution is stabilized, and water retainability and softness can be maintained. Easiness of ionization can also be determined by an acid dissociation constant (pKa).

(a-2) Monofunctional Monomer B

A monofunctional monomer B is not particularly limited, as long as it is a monomer having a carboxyl group and one ethylenic unsaturated group. Herein, the carboxyl group also includes cases where it exists in the monofunctional monomer B in a salt form. Further, the monofunctional monomer B may be a mixture of a monomer that is not in a salt form and a monomer that is in a salt form.

For example, examples of the monofunctional monomer B include (meth)acrylic acid, sodium (meth)acrylate, potassium (meth)acrylate, lithium (meth)acrylate, vinylbenzoic acid, sodium vinylbenzoate, potassium vinylbenzoate, lithium vinylbenzoate, vinylacetic acid, sodium vinylacetate, potassium vinylacetate, lithium vinylacetate, and the like.

(a-3) Content Ratio of Component Derived from Monofunctional Monomer A and Component Derived from Monofunctional Monomer B When the copolymer contains a component derived from the monofunctional Monomer B, it is preferable that the copolymer contains 30 mol % or more of the component derived from the monofunctional monomer A, and 70 mol % or less of the component derived from the monofunctional monomer B, based on the total of 100 mol % of the component derived from the monofunctional monomer A and the component derived from the monofunctional monomer B. By containing both components in the copolymer in these ranges, there can be provided a hydrogel that can be used even under the environment of a high-concentration aqueous electrolytic solution.

The content of the component derived from the monofunctional monomer A can take a range of 30 mol % or more and less than 100 mol %, specifically, can take 30 mol %, 40 mol %, 50 mol %, 60 mol %, 70 mol %, 80 mol %, 90 mol %, and 99 mol %.

(a-4) Polyfunctional Monomer

A polyfunctional monomer is not particularly limited, as long as it has 2 to 6 ethylenic unsaturated groups. From a viewpoint of alkali resistance, it is preferable that the polyfunctional monomer retain no ester bond. For example, examples of the polyfunctional monomer include divinylbenzene, sodium divinylbenzenesulfonate, divinylbiphenyl, divinylsulfone, diethylene glycol divinyl ether, pentaerythritol triallyl ether, pentaerythritol tetraallyl ether, dimethyldiallylammonium chloride, N,N'-methylenebis(meth)acrylamide, N,N'-ethylenebis(meth)acrylamide, N,N'-{[(2-acrylamide-2-[(3-acrylamidopropoxy)methyl]propan-1,3-diyl)bis(oxy)]bis(propan-1,3-diyl)}diacrylamide (CAS No. 1393329-90-2), N,N',N''-triacryloyldiethylenetriamine (CAS No. 34330-10-4), N,N',N'',N'''-tetraacryloyltriethylenetetramine (CAS No. 158749-66-7), N,N'-diacryloyl-2,7,10-trioxa-1,13-tridecanamine (CAS No. 160432-07-5), and the like. In order to allow the polyfunctional monomer to have more excellent alkali resistance, it is preferable that the polyfunctional monomer has no amide bond. The polyfunctional monomer may be only one kind, or may be a mixture of plural species.

It is preferable that a polymer derived from the polyfunctional monomer is contained at a ratio of 0.1 to 5 parts by mass, based on 100 parts by mass of the copolymer. When a ratio of the polymer derived from the polyfunctional monomer is less than 0.1 part by mass, the crosslinking density may become low. When the ratio is more than 5 parts by mass, the polymer derived from the polyfunctional monomer may phase-separate, becoming a hydrogel in which a crosslinked structure is non-uniform. The ratio is more preferably 0.2 to 4.5 parts by mass, further preferably 0.4 to 4.0 parts by mass.

In addition, the copolymer is composed of components derived from the monofunctional monomer and the polyfunctional monomer, and a use amount of each monomer at producing of the copolymer, and the content of each component in the copolymer are approximately identical. In addition, the content of the polymer derived from the polyfunctional monomer in the copolymer can be measured by pyrolysis GC and/or IR.

(b) Other Polymers

Polymers other than the copolymer of the above-mentioned monofunctional monomer and polyfunctional monomer may be contained in the polymer matrix in a form not polymerized with the above-mentioned copolymer, in such a range that the effect of the present invention is not inhibited. Examples of other polymers include a cellulose derivative and the like. It is preferable that a ratio of other polymers occupied in 100 parts by mass of the polymer matrix is less than 50 parts by mass.

(2) Polyacrylic Acid-Based Polymer

A polyacrylic acid-based polymer contained in the hydrogel according to the second aspect of the present invention is not particularly limited, as long as it can be used as an additive to the hydrogel. Since the polyacrylic acid-based polymer has a comparatively high cohesive force under the alkaline environment, it is considered that it has an action of increasing entanglement of a polymer network constituting the hydrogel, and making the hydrogel firm.

Examples of the polyacrylic acid-based polymer include a homopolymer of a carboxyl group-containing monomer, or a copolymer of a carboxyl group-containing monomer and a sulfonic acid group-containing monomer, and the like. Examples of the carboxyl group-containing monomer include (meth)acrylic acid, vinylbenzoic acid, maleic acid, fumaric acid, itaconic acid, alkali metal salts thereof, and the like. Examples of the sulfonic acid-based monomer include vinylsulfonic acid, methylvinylsulfonic acid, styrenesulfonic acid, (meth)acrylsulfonic acid, ethyl (meth)acrylate sulfonate, acrylamidehydroxypropanesulfonic acid, (meth)acrylamidemethylpropanesulfonic acid, allyloxypropanesulfonic acid, allylsulfonic acid, alkali metal salts thereof, and the like.

Examples of a specific polyacrylic acid-based polymer include poly(meth)acrylic acid, sodium poly(meth)acrylate, potassium poly(meth)acrylate, ammonium poly(meth)acrylate, a (meth)acrylic acid-maleic acid copolymer, a (meth)acrylic acid/sulfonic acid-based monomer copolymer, and the like.

It is preferable that the polyacrylic acid-based polymer shows absorption bands in a range of $1650 \pm 130$ cm$^{-1}$ and in a range of $1040 \pm 20$ cm$^{-1}$ in FT-IR measurement. The present inventors consider that an absorption band in a range of $1650 \pm 130$ cm$^{-1}$ is derived from carboxylic acid or a salt thereof, and an absorption band in a range of $1040 \pm 20$ cm$^{-1}$ is derived from sulfonic acid or a salt thereof.

It is preferable that the polyacrylic acid-based polymer is a polymer in which an absorbance ratio (absorbance$_{[1040 \pm 20\ cm-1]}$/absorbance$_{[1650 \pm 130\ cm-1]}$) of an absorbance of a maximum peak in a range of $1650 \pm 130$ cm$^{-1}$ (absorbance$_{[1650 \pm 130\ cm-1]}$) and an absorbance of a maximum peak in a range of $1040 \pm 20$ cm$^{-1}$ (absorbance$_{[1040 \pm 20\ cm-1]}$) obtained in FT-IR measurement shows a value in a range of 0.001 to 5.0. When an absorbance ratio is greater than 5.0, since a ratio derived from a sulfonic acid group unit in a polymer becomes high, a cohesive force at immersion in a high-concentration electrolytic solution becomes weak, and the strength reinforcing effect may not be obtained. When the ratio is less than 0.001, a cohesive force becomes too strong, and the hydrogel may cause syneresis and harden. An absorbance ratio is more preferably in a range of 0.001 to 4.5. A range of 0.005 to 4.0 is further preferable, a range of 0.01 to 3.5 is further preferable, a range of 0.025 to 3.0 is further preferable, a range of 0.05 to 3.0 is further preferable, a range of 0.1 to 3.0 is further preferable, and a range of 0.2 to 2.0 is particularly preferable.

The polyacrylic acid-based polymer exhibits a weight average molecular weight of 3,000 to 2,000,000. When a weight average molecular weight is less than 3,000, since a cohesive force of the polyacrylic acid-based polymer in the presence of a high-concentration electrolyte is weak, and entanglement between a polymer network and the polyacrylic acid-based polymer is small, the sufficient mechanical strength improving effect may not be obtained. When a weight average molecular weight exceeds 2,000,000, since a cohesive force of the polyacrylic acid-based polymer in the presence of a high-concentration electrolyte and entanglement between a polymer network and the polyacrylic acid-based polymer become too excessive, the hydrogel may be non-uniformly contracted, and form a distorted shape. An average polymerization degree is preferably 3,000 to 1,800,000, further preferably 3,000 to 1,500,000.

It is preferable that the polyacrylic acid-based polymer is contained at 0.5 to 19 parts by mass in 100 parts by mass of the hydrogel. When the content is less than 0.5 part by mass, the mechanical strength improving effect may not be obtained. When the content is more than 19 parts by mass, entanglement with a polymer network becomes too strong, and water retainability and softness of the hydrogel may be deteriorated. It is preferable that the content is 0.5 to 15 parts by mass.

The monofunctional monomer A-derived component and the polyacrylic acid-based polymer exist in the hydrogel at a mass ratio of 100:2.5 to 90. When a mass ratio of the polyacrylic acid-based polymer is less than 2.5, the mechanical strength improving effect may not be obtained. When the mass ratio is more than 90, entanglement with a polymer network becomes too strong, and water retainability and softness of the hydrogel may be deteriorated. The mass ratio is preferably 100:5 to 90, more preferably 100:7.5 to 90, further preferably 100:10 to 90.

(3) Water

Water contained in the hydrogel according to the second aspect of the present invention is contained at 21 to 89.5 parts by mass in 100 parts by mass of the hydrogel. When the content is less than 21 parts by mass, an amount at which an electrolyte component can be contained becomes small, and when used as a gel electrolyte of a battery, an impedance is high, and desired battery properties may not be obtained. When the content is more than 89.5 parts by mass, the mechanical strength of the hydrogel may become low. The content is more preferably 30 to 85 parts by mass, further preferably 40 to 80 parts by mass.

(4) Electrolyte Component

An electrolyte component may be dissolved in water. The hydrogel containing an electrolyte component can be used as a gel-like electrolyte. In addition, since a kind and a dissolved amount of the electrolyte component are the same as those of the electrolyte component in the above-mentioned first aspect, description thereof will be omitted.

(5) Other Components

The hydrogel according to the second aspect of the present invention may contain, as other components, (a) a supporting material, (b) a protective film, and (c) an additive, as necessary, and since they are the same as the above-mentioned (a) supporting material, (b) protective film, and (c) additive in the first aspect, description thereof will be omitted.

(Process for Producing Hydrogel)

The hydrogel can be produced, for example, through:
(i) a step (preparation step) of preparing a hydrogel precursor according to the first aspect of the present invention, comprising water, a monofunctional monomer, a polyfunctional monomer, and a polymerization initiator, or a hydrogel precursor according to the second aspect of the present invention, comprising water, a monofunctional monomer A, a monofunctional monomer B as an arbitrary component, a polyfunctional monomer, a polyacrylic acid-based polymer, and a polymerization initiator, and (ii) a step (polymerization step) of polymerizing the monofunctional monomer and the polyfunctional monomer to thereby obtain a hydrogel.

(1) Preparation Step

As the polymerization initiator in this step, any of a thermopolymerization initiator and a photopolymerization initiator can be used. It is preferable to use, among these, a photopolymerization initiator in which change in components before and after polymerization is small. Examples of the photopolymerization initiator include, for example, 2-hydroxy-2-methyl-1-phenyl-propane-1-one (product name: Omnirad 1173, manufactured by BASF Japan Ltd.), 1-hydroxy-cyclohexyl-phenyl-ketone (product name: Omnirad 184, BASF Japan Ltd.), 1-[4-(2-hydroxyethoxy)-phenyl]-2-hydroxy-2-methyl-propane-1-one (product name: Omnirad 2959, manufactured by BASF Japan Ltd.), 2-methyl-1-[methylthio)phenyl]-2-morpholinopropane-1-one (product name: Omnirad 907, manufactured by BASF Japan Ltd.), 2-benzyl-2-dimethylamino-1-(4-morpholinophenyl)-butane-1-one (product name: Omnirad 369, manufactured by BASF Japan Ltd.), and the like. The polymerization initiator may be only one kind, or may be a mixture of plural species.

It is preferable that a use amount of the polymerization initiator is 0.05 to 5 parts by mass, based on the total of 100 parts by mass of all monomers (monofunctional monomer, polyfunctional monomer, and arbitrary other monomer). When the use amount is less than 0.05 part by mass, a polymerization reaction does not sufficiently proceed, and an unpolymerized monomer may remain in the resulting hydrogel. When the use amount is more than 5 parts by mass, the hydrogel may have an odor due to the residue of the polymerization initiator after a polymerization reaction, or physical properties may be deteriorated by influence of the residue. The use amount is more preferably 0.06 to 3 parts by mass, further preferably 0.07 to 1.5 parts by mass.

When the hydrogel is produced, molding of a hydrogel precursor into a sheet shape includes, for example (i) a method of injecting a hydrogel precursor into a mold frame, (ii) a method of pouring a hydrogel precursor between protective films, and keeping it at a fixed thickness, (iii) a method of coating a hydrogel precursor on a protective film, and the like. The method (i) has an advantage that a hydrogel of an arbitrary shape can be obtained. Methods (ii) and (iii) have an advantage that a relatively thin hydrogel can be obtained. It is suitable to manufacture a hydrogel containing a supporting material by the method (i). In addition, the above-mentioned other monomer, additive, and the like may be contained in the hydrogel precursor.

(2) Polymerization Step

A network structure can be obtained by polymerizing the monofunctional monomer and the polyfunctional monomer in the hydrogel precursor by heat impartation or light irradiation. Conditions for heat impartation and light irradiation are not particularly limited, as long as a network structure can be obtained, and general conditions can be adopted.

(3) Other Steps

Examples of other steps include an electrolyte component incorporation step. In the electrolyte component incorporation step, by immersing the hydrogel after polymerization in an aqueous electrolyte component solution, an electrolyte component in an aqueous alkali solution is dissolved in water in the hydrogel. This immersion is performed under conditions for obtaining a hydrogel of a desired amount of an electrolyte component. For example, regarding an immersion temperature, the step can be performed under cooling, an ambient temperature (about 25° C.) and warming at 4 to 80° C. An immersion time can be 6 to 336 hours under the ambient temperature.

By drying the hydrogel after immersion, the water content may be adjusted. Examples of the adjustment include, for example, making the masses of the hydrogel before and after immersion approximately the same.

(Use of Hydrogel)

The hydrogel can be used in an alkaline battery (for example, gel-like electrolyte, separator, and the like).

The alkaline battery herein is a secondary battery in which the hydrogel can be used as an electrolyte layer and/or a separator between a cathode and an anode. Examples of such a secondary battery include a nickel-hydrogen secondary battery, a nickel-zinc secondary battery, a zinc air battery, a lithium air battery, an aluminum air battery, a magnesium air battery, a calcium air battery, a hydrogen air battery, and the like. Since these secondary batteries use an aqueous alkali solution as an electrolytic solution, liquid leakage from the secondary battery can be prevented by the hydrogel.

A constitution of the alkaline battery is not particularly limited, and any of general constitutions can be used. For example, nickel or a nickel alloy can be used as a cathode of a nickel-hydrogen secondary battery, a hydrogen storage alloy can be used as an anode, nickel or a nickel alloy can be used as a cathode of a nickel-zinc secondary battery, and zinc or zinc oxide can be used as an anode. A cathode and an anode may be formed on a current collector composed of nickel, aluminum, copper or the like.

When the hydrogel is a separator, it is preferable that the hydrogel is provided with a supporting material (intermediate base material).

In the alkaline battery, in a charge-discharge cycle test described in Examples, the cycle number at which the charge/discharge efficiency becomes 60% or less is preferably 65 cycles or more, more preferably 70 cycles or more, further preferably 75 cycles or more, particularly preferably 80 cycles or more. The large cycle number means inhibition of internal short circuit due to a dendrite generated on an anode.

In addition, the charge/discharge efficiency after 40 times charge and discharge is preferably 70% or more, more preferably 75% or more, further preferably 80%.

Examples of use other than the alkaline battery include use such as a material for a condenser, a material for an electric double layer capacitor, and a material for a concrete anticorrosion method.

EXAMPLES

The present invention will be further specifically described below by way of Examples, but the present invention is not at all limited thereto. First, methods of measuring various physical properties that are measured in Examples will be described.

(Swelling Degree)
(1) Swelling Degree with 4M Aqueous KOH Solution (Method a: Examples 1a to 5a and Comparative Examples 1a to 7a)

A hydrogel before alkali immersion was cut into 5 mm squares, and weighed. Thereafter, the hydrogel was placed into a 250 mesh tea bag made of polyethylene, and the tea bag was immersed in 100 mL of a 4M aqueous KOH solution. Thereafter, after immersion under the temperature of 25° C. and 60° C. for 14 days, 21 days, and 35 days, the tea bag from which water had been drained for 10 minutes was weighed, to obtain a tea bag containing the hydrogel swollen with a 4M aqueous KOH solution. In addition, when the hydrogel became soft and passed through meshes at the time of water draining, this was described as "liquefied".

Regarding a swelling degree, with the mass of a tea bag not containing a hydrogel that had been immersed in a 4M aqueous KOH solution being a blank, a value obtained by subtracting the mass of the blank from the mass of a tea bag containing a hydrogel that had been swollen with a 4M aqueous KOH solution, was divided by the mass of a hydrogel before swelling, and then multiplied by 100 to calculate a swelling degree (%). Swelling degrees after immersion for 14 days, after immersion for 21 days, and after immersion for 35 days at 25° C. were defined as $B_{25°\ C.\ [14\ days\ period]}$, $B_{25°\ C.\ [21\ days\ period]}$, and $B_{25°\ C.\ [35\ days\ period]}$, respectively, and swelling degrees after immersion for 14 days, after immersion for 21 days, and after immersion for 35 days at 60° C. were defined as $B_{60°\ C.\ [14\ days\ period]}$, $B_{60°\ C.\ [21\ days\ period]}$, and $B_{60°\ C.\ [35\ days\ period]}$, respectively.

When the hydrogel uses a non-woven fabric or the like as a supporting material, 0.3 g of the hydrogel was scraped off from the supporting material, and a swelling degree was calculated using it as a measurement sample and in the same manner as that of the above-mentioned method.

(2) Swelling Degree with Aqueous Solution Containing 1.5M LiOH and 10M LiCl (Method b: Examples 1b to 13b and Comparative Examples 1b to 6b)

A hydrogel was cut into width 5 mm×length 5 mm×2 mm thickness, and weighed. Thereafter, the hydrogel was placed into a 250 mesh tea bag made of polyethylene, and the tea bag was immersed in 100 mL of an aqueous solution containing 1.5M LiOH and 10M LiCl. Thereafter, after immersion under a temperature of 25° C. for one week, the tea bag from which water had been drained for 10 minutes was weighed, to obtain a tea bag containing the hydrogel swollen with an aqueous solution containing 1.5M LiOH and 10M LiCl. In addition, when the hydrogel became soft and passed through meshes at the time of water draining, this was described as "liquefied".

Regarding a swelling degree, with the mass of a tea bag not containing a hydrogel that had been immersed in an aqueous solution containing 1.5M LiOH and 10M LiCl being a blank, a value obtained by subtracting the mass of the blank from the mass of a tea bag containing a hydrogel that had been swollen with an aqueous solution containing 1.5 M LiOH and 10M LiCl, was divided by the mass of a hydrogel before swelling, and then multiplied by 100 to calculate a swelling degree (%).

When the hydrogel uses a non-woven fabric or the like as a supporting material, 0.3 g of the hydrogel was scraped off from the supporting material, and a swelling degree was calculated using it and in the same manner as that of the above-mentioned method.

(Piercing Strength)
(1) Piercing Strength with 4M Aqueous KOH Solution (Method a: Examples 1a to 5a and Comparative Examples 1a to 7a)

A hydrogel was excised into width 30 mm×length 30 mm×2 mm thickness. The excised hydrogel was immersed in 100 mL of a 4M aqueous KOH solution under the temperature of 25° C. and 60° C. for 14 days, 21 days, and 35 days, and thereafter, each was defined as a hydrogel after alkali solution immersion. After various hydrogels that had been pulled up after immersion in an alkali solution for a prescribed time were placed under the environment of 23° C. and humidity of 50% for 3 hours, a piercing test was carried out using a Texture Analyzer TA. XT Plus (manufactured by EKO Instruments Co., Ltd.). The hydrogel was placed on a stage having a hole with a diameter of 7 mm, and was adjusted at a position where a cylindrical jig made of stainless steel having a diameter of 3 mm passes through a center of the hole of the stage. Thereafter, the sample was pierced at a speed of 1.0 mm/second, and a maximum stress until a tip of the jig penetrates therethrough was measured. This measurement was performed for 5 test pieces, a maximum stress was calculated, and an average thereof was defined as piercing strength. Thereupon, the piercing strengths after immersion for 14 days, after immersion for 21 days, and after immersion for 35 days at 25° C. were defined as $F_{25°\ C.\ [14\ days\ period]}$, $F_{25°\ C.\ [21\ days\ period]}$, and $F_{25°\ C.\ [35\ days\ period]}$, respectively, and the piercing strengths after immersion for 14 days, after immersion for 21 days, and after immersion for 35 days at 60° C. were defined as $F_{60°\ C.\ [14\ days\ period]}$, $F_{60°\ C.\ [21\ days\ period]}$, and $F_{60°\ C.\ [35\ days]}$, respectively. In addition, when the thickness of a sheet was less than 2 mm, sheets were laminated so that the thickness became 2 mm.

(2) Piercing Strength with Aqueous Solution containing 1.5M LiOH and 10M LiCl (Method b: Examples 1b to 13b and Comparative Examples 1b to 6b)

A hydrogel was excised into width 30 mm×length 30 mm×2 mm thickness. A gel obtained by immersing the excised hydrogel in 100 mL of an aqueous solution containing 1.5M LiOH and 10M LiCl under a temperature of 25° C. for one week was defined as a hydrogel after alkali solution immersion. The hydrogel after alkali solution immersion was pulled up from an electrolytic solution, water was drained for 10 minutes, and thereafter, a piercing test was carried out by the following procedure under the environment of 23° C. and humidity of 50% RH using a Texture Analyzer TA. XT Plus (manufactured by EKO Instruments Co., Ltd.). The hydrogel after alkali solution immersion was placed on a stage having a hole with a diameter of 7 mm, and was adjusted at a position where a cylindrical jig made of stainless steel having a diameter of 3 mm passes through a center of the hole of the stage. Thereafter, the sample was pierced at a speed of 1.0 mm/second, and a maximum stress until a tip of the jig penetrates therethrough was measured. This measurement was performed for 5 test pieces, a maximum stress was calculated, and an average thereof was defined as piercing strength. When the thickness of a test piece was less than 2 mm, sheets were laminated, and adjusted so that the thickness of the laminated sheet became 2 mm, and measurement was performed.

(Energization Time in Direct Current Polarization Measurement)

By stacking two zinc electrode plates in the state where a hydrogel was interposed between opposite zinc electrode plates of width 15 mm, length 40 mm, and thickness 300 μm, a laminate of a zinc electrode plate and the hydrogel was prepared. Furthermore, by holding the above-mentioned laminate with two 70 mm square acrylic plates to fix these, a cell for direct current polarization measurement was prepared. In addition, by holding a sheet made of Teflon (registered trademark) of width 10 mm, length 30 mm, and thickness 800 μm between acrylic plates, at a place where the laminate of a zinc electrode plate and the hydrogel did not exist, between two acrylic plates, an interval between zinc electrode plates was adjusted so as to be 200 μm. This cell for direct current polarization measurement was immersed in a 4M aqueous KOH solution in which zinc oxide had been dissolved to saturation, at 25° C. for 72 hours. The cell for direct current polarization measurement after immersion was placed into an acrylic solution containing a 4M aqueous KOH solution, in which zinc oxide had been dissolved to saturation, a DC constant current at 1 mA/cm² was passed between zinc electrode plates of the cell for direct current polarization measurement, and a change in a voltage with time was measured, using a measuring apparatus HJ1010SD8 (manufactured by Hokuto Denko Corporation). Thereupon, a measurement voltage of 0.014 V or more was defined as energization state, and the time during which the energization state is retained from measurement initiation was defined as energization time. In addition, when a measurement voltage became less than 0.014V, this was defined as short circuit state.

(Voltage Per 1 cm² of Zinc Electrode Plate after Passage of 40 Minutes in Direct Current Polarization Measurement)

In the above-mentioned direct current polarization measurement, a value obtained by calculation by dividing a voltage at passage of 40 minutes from energization initiation by an area of a zinc electrode plate was defined as "voltage per 1 cm² of a zinc electrode plate after passage of 40 minutes in direct current polarization measurement".

(Charge and Discharge Test)

By immersing a hydrogel in a 4M aqueous KOH solution in which zinc oxide had been dissolved to saturation (electrolyte component) at 25° C. for 72 hours, an electrolyte component-impregnated hydrogel was obtained.

After 80 parts by mass of zinc oxide, 5 parts by mass of calcium carbonate, 5 parts by mass of acetylene black as an electrically conductive aid, and 10 parts by mass of polyvinylidene fluoride (PVDF) as a binding agent were mixed, an appropriate amount of NMP (n-methyl-2-pyrrolidone) was added so that the solid content became 40% by mass. By further mixing the resulting mixture with a rotation and revolution type mixer at 2,000 rpm for 20 minutes, an anode mix was prepared. The resulting anode mix was fixed to Celmet (manufactured by Sumitomo Electric Industries, Ltd.), and this was dried at 150° C. for 5 hours, thereafter, roll-pressed, and cut into 20 mm×30 mm to thereby obtain an anode. The thickness of the anode was 700 μm on average, the anode capacity per a unit area was 25 mAh/cm², and the capacity of the prepared anode was 150 mAh.

After 91.5 parts by mass of nickel hydroxide, 3.15 parts by mass of cobalt hydroxide, 0.13 part by mass of carboxymethylcellulose sodium (manufactured by Daicel Corporation, 2260) as a thickener, 0.22 part by mass of polyethylene glycol mono-p-isooctyl phenyl ether (manufactured by Nacalai Tesque, Inc., Triton X) as a dispersant, and 5 parts by mass of polytetrafluoroethylene (PTFE) as a binding agent were mixed, an appropriate amount of ion-exchanged water was added so that the solid content became 50% by mass. By further mixing the resulting mixture with a rotation and revolution type mixer at 2,000 rpm for 20 minutes, a cathode mix was prepared. The resulting cathode mix was fixed to Celmet (manufactured by Sumitomo Electric Industries, Ltd.), this was dried at 80° C. for 5 hours or longer, thereafter, roll-pressed, and cut into 20 mm squares to thereby obtain a cathode. The thickness of the cathode was 600 μm on average, the cathode capacity per a unit area was 32 mAh/cm², and the capacity of the prepared cathode was 128 mAh.

Both sides of the above-mentioned anode were held with the above-mentioned electrolyte component-impregnated hydrogel of 40 mm×30 mm, the above-mentioned anode was arranged on an outer side thereof, and a whole was further fixed with an acrylic plate to thereby obtain a nickel-zinc storage battery cell for a charge and discharge test. This cell was a cell of cathode capacity regulation in which the cathode capacity is largely excessive relative to the anode capacity. A nickel-zinc storage battery cell was charged at a 1/4 C rate relative to the cathode capacity for 1 hour, discharged at a 1/4 C rate for 1 hour, thereafter, charged at a 1/4 C rate for 2 hours, and discharged at a 1/4 C rate for 1 hour. The cell was subjected to a charge-discharge cycle test, in which the cell is charged at a 1/2 C rate for 1 hour, and charged and discharged at a 1/2 C rate for 1 hour. Charge and discharge times was defined as charge and discharge times at a 1/2 C rate.

The charge-discharge cycle test was 1 hour charge and 1 hour discharge, and a discharge cut-off voltage was 1.0 V. Herein, a 1 C rate was defined as a current amount at which the total capacity of an anode can be charged or discharged for 1 hour. For example, when the capacity of a cathode is assumed to be 128 mAh, a 1 C rate was 128 mA, a 1/2 C rate was 68 mA, and a 1/4 C rate was 32 mA.

(Melting Point)

A melting point of the polyfunctional monomer was calculated by differential scanning calorimetry (DSC measurement).

(Bending Test after Electrolytic Solution Immersion)

A hydrogel was cut into width 20 mm×length 30 mm, and immersed in 100 mL of an aqueous solution containing 1.5M LiOH and 10M LiCl for one week. The hydrogel after immersion was bended until both ends on a long side thereof contact each other. Thereupon, when the hydrogel was not cracked, this was assessed to be 0, and when the hydrogel was cracked, this was assessed to be x.

(AC Impedance Measurement)

A hydrogel was excised into width 20 mm×length 20 mm×2 mm thickness, and immersed in 100 mL of an aqueous solution containing 1.5M LiOH and 10M LiCl for one week, and this hydrogel was defined as a hydrogel after high-concentration electrolytic solution immersion. The hydrogel after high-concentration electrolytic solution immersion was held with two Ni plates (width 20 mm, length 40 mm, thickness 1.0 mm), and this was used as a test piece. Using a FRA impedance analyzer (manufactured by Autolab Inc., PGSTAT), and setting an AC amplitude at 10 mV (r.m.s.) and a measurement frequency range at 100 kHz to 100 Hz, an AC impedance of the test piece was measured by a two-terminal method. From the resulting measurement results, a real number component (Z'/Ω) of an impedance at a frequency of 100 kHz was defined as an impedance at a frequency of 100 kHz, and a real number component (Z'/Ω) of an impedance at a frequency of 1 kHz was defined as an impedance at a frequency of 1 kHz. When the thickness of the test piece was less than 2 mm, sheets were laminated, and adjusted so that the thickness of the laminated sheets became 2 mm, and measurement was performed.

(Weight Average Molecular Weight)

A weight average molecular weight (Mw) was defined as a pullulan-converted weight average molecular weight measured using gel permeation chromatography (GPC). Specifically, 50 mg of a sample was dissolved in 5 mL of a 0.2M aqueous $NaNO_3$ solution (immersion time: 24±1 hr (complete dissolution)), the solution was filtered by an aqueous 0.45 μm Chromatodisk (13N) manufactured by GL Co., Ltd., thereafter, measurement was performed using a chromatograph under the following measuring conditions, and a weight average molecular weight of the sample was obtained from a pre-prepared standard pullulan working curve.

Apparatus used: HLC-8020GPC EcoSEC (RI detector built-in with UV detector) manufactured by Tosoh Corporation Guard column: TSK GUARDCOLUMN PWXL-H (6.0 mm I.D.×4.0 cm) manufactured by Tosoh Corporation× one column Column: TSKgel G6000 PWXL (7.8 mm I.D.×30 cm) manufactured by Tosoh Corporation×one column+ TSKgel G3000 PWXL (7.8 mm I.D.×30 cm) manufactured by Tosoh Corporation×one column Column temperature: 40° C.

Mobile phase: 0.2M aqueous $NaNO_3$ solution

Mobile phase flow rate: Reference side pump=0.6 mL/min

Sample side pump=0.6 mL/min

Detector: RI detector

Sample concentration: 1.0 wt %

Injection amount: 100 μL

Measurement time: 65 min

Sampling pitch: 500 msec

As a standard pullulan sample for a working curve, a sample of product name "Shodex" having a weight average molecular weight of 2,560,000, 1,600,000, 380,000, 212,000, 100,000, 48,000, 23,700, 12,200, or 5,800, manufactured by SHOWA DENKO K.K. was used.

After the above-mentioned standard pullulan for a working curve was classified into A (1,600,000, 212,000, 48,000, 12,200) and B (2,560,000, 380,000, 100,000, 23,700, 5,800), each 1 to 2.5 mg of A was weighed, and thereafter, dissolved in 2 mL of distilled water, and each 1 to 2.5 mg of B was also weighed, and thereafter, dissolved in 2 mL of distilled water. A standard pullulan working curve was obtained by injecting 100 μL of each of prepared A and B-dissolved solutions, and preparing a calibration curve (cubic expression) from the retention time obtained after measurement, and a weight average molecular weight was calculated using the working curve.

(FT-IR Measurement)

In measurement of an absorbance of a polyacrylic acid-based polymer, an absorbance$_{[1040±20\ cm-1]}$ and an absorbance$_{[1650±130\ cm-1]}$ were obtained by the method below, and an absorbance ratio=(absorbance$_{[1040±20\ cm-1]}$/absorbance$_{[1650±130\ cm-1]}$) was calculated.

Specifically, a sample that had been dried under a temperature of 80° C. for 80 hours was taken out, and an infrared absorption spectrum was obtained by a single reflection-type ATR method (=fine surface part analyzing method).

Measuring apparatus: Fourier transform infrared spectrophotometer Nicolet iS10 (manufactured by Thermo SCIENTIFIC) and single reflection-type horizontal ATR Smart-iTR (manufactured by Thermo SCIENTIFIC)

ATR crystal: Diamond with ZnSe lens, angle 42°

Measuring method: Single ATR method

Measurement wavenumber region: 4,000 $cm^{-1}$ to 650 $cm^{-1}$

Wavenumber dependency of measurement depth: Not corrected

Detector: Deuterated triglycine sulfate (DTGS) detector and KBr beam splitter

Resolution: 4 $cm^{-1}$

Integration times: 16 times (the same at background measurement)

Test number: n=3

In an ATR method, since the intensity of an infrared absorption spectrum obtained by measurement varies depending on a degree of adhesion between a sample and a high refractive index crystal, a maximum load that can be applied by "Smart-iTR" of an ATR accessory was applied to make an adhesion degree approximately uniform, and measurement was performed. An infrared absorption spectrum obtained under the above conditions was peak-treated as described below, to obtain an absorbance$_{[1040\pm20\ cm\text{-}1]}$ and an absorbance$_{[1650\pm130\ cm\text{-}1]}$, and an absorbance ratio=(absorbance$_{[1040\pm20\ cm\text{-}1]}$/absorbance$_{[1650\pm130\ cm\text{-}1]}$) was calculated. The resulting absorbance$_{[1040\pm20\ cm\text{-}1]}$ means a maximum value of an absorbance difference between a baseline in an infrared absorption spectrum at a wavenumber of $1040\pm20$ cm$^{-1}$ (measured absorbance−absorbance of baseline), with a straight line binding wavenumbers $1070\pm10$ cm$^{-1}$ and $990\pm20$ cm$^{-1}$ at a minimum absorbance position that does not cross with an infrared absorption spectrum on the way being a baseline. In addition, in this measurement of an absorbance, even when another absorbance spectrum is overlapped at a maximum absorption spectrum, peak separation was not carried out.

The resulting absorbance$_{[1650\pm130\ cm\text{-}1]}$ means a maximum value of an absorbance difference between a baseline in an infrared absorption spectrum at a wavenumber of $1650\pm130$ cm$^{-1}$ (measured absorbance−absorbance of baseline), with a straight line binding wavenumbers $1770\pm40$ cm$^{-1}$ and $1490\pm20$ cm$^{-1}$ at a minimum absorbance position that does not cross with an infrared absorption spectrum on the way being a baseline. In addition, in this measurement of an absorbance, even when another absorption spectrum is overlapped at a maximum absorption spectrum, peak separation was not carried out.

Example 1a 20 parts by mass of acrylic acid (manufactured by Toagosei Co., Ltd.) as a monofunctional monomer, 0.34 part by mass of N,N',N"-triacryloyldiethylenetriamine (manufactured by FUJIFILM Corporation, FAM301, melting point 89° C.) as a polyfunctional monomer, and 80 parts by mass of ion-exchanged water were placed into a container, and the mixture was stirred. To this solution was added 0.20 part by mass of Omnirad 1173 (manufactured by BASF Japan Ltd.) as a polymerization initiator, and the mixture was stirred using a magnetic stirrer (manufactured by AS ONE Corporation, RS-6AR) to thereby prepare a hydrogel precursor. A silicon frame having the thickness of 2 mm was placed on a peelable PET film, the hydrogel precursor was poured into the frame, and thereafter, a peelable PET film was placed on the hydrogel precursor. Thereafter, a step of irradiating an ultraviolet ray at the energy of 7,000 mJ/cm$^2$ with a small UV polymerizer (manufactured by JATEC Co., Ltd., J-cure1500, metal halide lamp type name MJ-1500L) under the conditions of a conveyer speed of 0.4 m/min and an interwork distance of 150 mm was performed three times to thereby prepare a sheet-like hydrogel having the thickness of 2 mm. The prepared hydrogel was subjected to a piercing test after alkali solution immersion.

Separately, a hydrogel used in direct current polarization measurement and a charge and discharge test was prepared by the following procedure. A polyolefin non-woven fabric having the thickness of 103 µm and the basis weight of 45 g/m$^2$ (manufactured by Japan Vilene Company, Ltd., OA-18738P) as a supporting material was arranged between two peelable PET films, the above-mentioned hydrogel precursor was poured therein, thereafter, the thickness was adjusted with a roller so as to be 200 µm, and thereafter, an ultraviolet ray under irradiation conditions of 65 mW/cm$^2$, 7,000 mJ/cm$^2$ was irradiated using a UV lamp system (manufactured by Heraeus GmbH, apparatus name: Light Hammer 10) to thereby prepare a hydrogel having the thickness of 200 µm. Swelling properties assessment, a direct current polarization test, a charge and discharge test, and appearance assessment after electrolytic solution immersion of the prepared hydrogel were performed.

Example 2a

In the same manner as that of Example 1a except that the polyfunctional monomer was changed to 0.66 part by mass of N,N'-{[2-acrylamide-2-[(3-acrylamidopropoxy)methyl]propan-1,3-diyl]bis(oxy)]bis(propan-1,3-diyl)]diacrylamide (manufactured by FUJIFILM Corporation, FAM401, melting point 107° C.), a hydrogel was obtained. Swelling properties assessment, a piercing test after alkali solution immersion, a direct current polarization test, a charge and discharge test, and appearance assessment after electrolytic solution immersion of the resulting hydrogel were performed.

Example 3a

In the same manner as that of Example 1a except that the polyfunctional monomer was changed to 0.47 part by mass of N,N',N",N"'-tetraacryloyltriethylenetetramine (manufactured by FUJIFILM Corporation, FAM402, melting point 110° C.), a hydrogel was obtained. Swelling properties assessment, a piercing test after alkali solution immersion, a direct current polarization test, a charge and discharge test, and appearance assessment after electrolytic solution immersion of the resulting hydrogel were performed.

Examples 4a

In the same manner as that of Example 1a except that the monofunctional monomer was changed to 2-acrylamide-2-methylpropanesulfonic acid (manufactured by MCC UNITEC Co., Ltd., AMPS), a hydrogel was obtained. Swelling properties assessment, a piercing test after alkali solution immersion, a direct current polarization test, a charge and discharge test, and appearance assessment after electrolytic solution immersion of the resulting hydrogel were performed.

Example 5a

In the same manner as that of Example 2a except that the monofunctional monomer was changed to 2-acrylamide-2-methylpropanesulfonic acid, a hydrogel was obtained. Swelling properties assessment, a piercing test after alkali solution immersion, a direct current polarization test, a charge and discharge test, and appearance assessment after electrolytic solution immersion of the resulting hydrogel were performed.

Comparative Example 1a

In the same manner as that of Example 1a except that the polyfunctional monomer was changed to 0.3 part by mass of sodium divinylbenzenesulfonate (manufactured by Tosoh Organic Chemical Co., Ltd., DVBS), a hydrogel was obtained. Swelling properties assessment, a piercing test after alkali solution immersion, a direct current polarization test, and a charge and discharge test of the resulting hydrogel were performed.

Comparative Example 2a

In the same manner as that of Example 1a except that the polyfunctional monomer was changed to 0.6 part by mass of sodium divinylbenzenesulfonate (manufactured by Tosoh Organic Chemical Co., Ltd.), a hydrogel was obtained. Swelling properties assessment, a piercing test after alkali solution immersion, a direct current polarization test, and a charge and discharge test of the resulting hydrogel were performed.

Comparative Example 3a

In the same manner as that of Example 1a except that the polyfunctional monomer was changed to 0.3 part by mass of A-200 having two ethylenic unsaturated groups and an ester bond (manufactured by Shin-Nakamura Chemical Co., Ltd., polyethylene glycol #200 diacrylate), a hydrogel was obtained. Since the resulting hydrogel was liquefied at immersion in an alkali solution, various physical properties could not be measured.

Comparative Example 4a

In the same manner as that of Example 1a except that the polyfunctional monomer was changed to 0.4 part by mass of A-400 having two ethylenic unsaturated groups and an ester bond (manufactured by Shin-Nakamura Chemical Co., Ltd., polyethylene glycol #400 diacrylate), a hydrogel was obtained. Since the resulting hydrogel was liquefied at alkali solution immersion, various physical properties could not be measured.

Comparative Example 5a

In the same manner as that of Example 1a except that the polyfunctional monomer was changed to 0.45 part by mass of A-GLY-9EA having three ethylenic unsaturated groups and an ester bond (manufactured by Shin-Nakamura Chemical Co., Ltd., Ethoxylated glycerine triacrylate), a hydrogel was obtained. Since the resulting hydrogel was liquefied at alkali solution immersion, various physical properties could not be measured.

Comparative Example 6a

In the same manner as that of Example 1a except that the polyfunctional monomer was changed to 0.3 part by mass of A-TMMT having four ethylenic unsaturated groups and an ester bond (manufactured by Shin-Nakamura Chemical Co., Ltd., pentaerythritol tetraacrylate), a hydrogel was obtained. Since the resulting hydrogel was liquefied at alkali solution immersion, various physical properties could not be measured.

Comparative Example 7a

According to the contents described in Japanese Unexamined Patent Application, First Publication No. 2015-095286, 5 g of an aqueous polytetrafluoroethylene emulsion solution having the 60 mass % concentration (manufactured by Daikin Industries, Ltd., Polyflon PTFED-210C), and 2.5 g of an aqueous polyethyleneimine solution having the 20 mass % concentration (manufactured by Nippon Shokubai Co., Ltd., EPOMIN SP200) were kneaded into 2.5 g of hydrotalcite as a layered double hydroxide, and the kneaded product was rolled to thereby obtain a 200 µm sheet. Swelling properties assessment, a piercing test after alkali solution immersion, a direct current polarization test, and a charge and discharge test of the resulting sheet were performed.

Raw material species of Examples 1a to 5a and Comparative Examples 1a to 7a, and use ratios thereof are shown in Table 1, and results of Examples 1a to 5a and Comparative Examples 1a to 7a are shown in Table 2.

TABLE 1

| | | | Example | | | | | Comparative Example | | | | | | |
|---|---|---|---|---|---|---|---|---|---|---|---|---|---|---|
| | | | 1a | 2a | 3a | 4a | 5a | 1a | 2a | 3a | 4a | 5a | 6a | 7a |
| Monofunctional monomer | Acrylic acid | Parts by mass | 20 | 20 | 20 | — | — | 20 | 20 | 20 | 20 | 20 | 20 | — |
| | 2-Acrylamide-2-methyl-propanesulfonic acid | | — | — | — | 20 | 20 | — | — | — | — | — | — | — |
| Polyfunctional monomer | FAM301 | | 0.34 | — | — | 0.34 | — | — | — | — | — | — | — | — |
| | FAM401 | | — | 0.66 | — | — | 0.66 | — | — | — | — | — | — | — |
| | FAM402 | | — | — | 0.47 | — | — | — | — | — | — | — | — | — |
| | A-200 | | — | — | — | — | — | — | — | 0.3 | — | — | — | — |
| | A-400 | | — | — | — | — | — | — | — | — | 0.4 | — | — | — |
| | A-GLY-9EA | | — | — | — | — | — | — | — | — | — | 0.45 | — | — |
| | A-TMMT | | — | — | — | — | — | — | — | — | — | — | 0.3 | — |
| | Sodium divinylbenzenesulfonate | | — | — | — | — | — | 0.3 | 0.6 | — | — | — | — | — |
| Polymerization initiator | Omnirad 1173 | | 0.2 | 0.2 | 0.2 | 0.2 | 0.2 | 0.2 | 0.2 | 0.2 | 0.2 | 0.2 | 0.2 | — |
| Water | | | 80 | 80 | 80 | 80 | 80 | 80 | 80 | 80 | 80 | 80 | 80 | — |
| Hydrotalcite | | | — | — | — | — | — | — | — | — | — | — | — | 2.5 |
| 60 mass % aqueous polytetrafluoroethylene emulsion solution | | | — | — | — | — | — | — | — | — | — | — | — | 5 |
| 20 mass % aqueous polyethyleneimine solution | | | — | — | — | — | — | — | — | — | — | — | — | 2.5 |

TABLE 2

| | | Example | | | | | Comparative Example | | | | | | |
|---|---|---|---|---|---|---|---|---|---|---|---|---|---|
| | | 1a | 2a | 3a | 4a | 5a | 1a | 2a | 3a | 4a | 5a | 6a | 7a |
| Swelling degree with 4M aqueous KOH solution (%) | $B_{25°C.\ [14\ days\ period]}$ | 459 | 378 | 381 | 480 | 421 | 868 | 713 | Alkali solution: Liquefied at 4M aqueous KOH solution immersion | | | | 110 |
| | $B_{25°C.\ [21\ days\ period]}$ | 463 | 383 | 381 | 482 | 426 | 815 | 720 | | | | | 115 |
| | $B_{25°C.\ [35\ days\ period]}$ | 462 | 386 | 386 | 486 | 422 | 846 | 725 | | | | | 118 |
| | $B_{60°C.\ [14\ days\ period]}$ | 467 | 387 | 397 | 491 | 435 | 790 | 715 | | | | | 114 |
| | $B_{60°C.\ [21\ days\ period]}$ | 474 | 391 | 398 | 488 | 432 | 799 | 721 | | | | | 111 |
| | $B_{60°C.\ [35\ days\ period]}$ | 472 | 393 | 401 | 495 | 432 | 801 | 714 | | | | | 118 |
| Piercing strength with 4M aqueous KOH solution (N) | $F_{25°C.\ [14\ days\ period]}$ | 0.613 | 0.501 | 0.623 | 0.556 | 0.525 | 0.195 | 0.385 | | | | | 2.201 |
| | $F_{25°C.\ [21\ days\ period]}$ | 0.624 | 0.511 | 0.635 | 0.568 | 0.531 | 0.201 | 0.386 | | | | | 2.311 |
| | $F_{25°C.\ [35\ days\ period]}$ | 0.618 | 0.507 | 0.631 | 0.561 | 0.528 | 0.185 | 0.384 | | | | | 2.185 |
| | $F_{60°C.\ [14\ days\ period]}$ | 0.623 | 0.554 | 0.653 | 0.583 | 0.534 | 0.168 | 0.386 | | | | | 2.265 |
| | $F_{60°C.\ [21\ days\ period]}$ | 0.628 | 0.553 | 0.668 | 0.572 | 0.564 | 0.161 | 0.386 | | | | | 2.235 |
| | $F_{60°C.\ [35\ days\ period]}$ | 0.619 | 0.523 | 0.642 | 0.568 | 0.513 | 0.158 | 0.345 | | | | | 2.245 |
| Energization time (minutes) | | 2245 | 1417 | 2357 | 2135 | 1850 | 340 | 625 | | | | | 285 |
| Results of direct current polarization test (voltage: mV) | | 4.5 | 4.3 | 4.1 | 4.2 | 4.1 | 4.3 | 4.2 | | | | | 25.8 |
| Cycle times at which charge/discharge efficiency becomes X % or less (times) | X = 60 | 88 | 93 | 94 | 92 | 91 | 58 | 62 | | | | | 102 |
| | X = 50 | 93 | 98 | 99 | 94 | 95 | 59 | 65 | | | | | 111 |
| | X = 40 | 99 | 103 | 106 | 101 | 102 | 60 | 66 | | | | | 118 |
| Charge/discharge efficiency after 40 charge/discharge cycle times (%) | | 85 | 86 | 88 | 87 | 86 | 83 | 82 | | | | | 65 |

From Table 2, it can be seen that by using, as a constituent of a copolymer, a polyfunctional monomer having no ester bond, and having an amide group and 3 to 6 ethylenic unsaturated groups, there can be provided a hydrogel that has a long energization time, and is excellent in charge and discharge cycle properties, that is, a hydrogel that is excellent in performance of inhibiting growth of a dendrite.

Comparative Example 8a

In the same manner as that of Example 1a except that the polyfunctional monomer was changed to 0.6 part by mass of sodium divinylbenzenesulfonate (manufactured by Tosoh Organic Chemical Co., Ltd.), and the supporting material was changed to a polypropylene-polyethylene-based nonwoven fabric (manufactured by Shinwa Co., Ltd., 9515F) having the thickness of 80 μm, a hydrogel having the thickness of 200 μm was obtained. Appearance assessment after electrolytic solution immersion of the resulting hydrogel was performed. Results are shown in Table 3 together with results of Examples 1a to 5a. In addition, appearance assessment was the following warping/winding assessment.

(Assessment of Warping/Winding)

The resulting hydrogel was excised into 30 mm squares. The excised hydrogel was immersed in 100 mL of a 4M aqueous KOH solution under a temperature of 25° C. for 3 days. A distance between adjacent apexes of the hydrogel after immersion was measured, and an interapex distance D was obtained. When the interapex distance D is divided by 30 mm, if the value is less than 0.75, this means that the hydrogel after electrolytic solution immersion is warped or wound, and accordingly, this was assessed to be x. On the other hand, when the value is 0.75 or more, this means that a sheet of the hydrogel is not changed in a shape after electrolytic solution immersion, and accordingly, this was assessed to be 0.

TABLE 3

| | Example | | | | | Comparative Example |
|---|---|---|---|---|---|---|
| | 1a | 2a | 3a | 4a | 5a | 8a |
| Thickness of supporting material (μm) | 103 | 103 | 103 | 103 | 103 | 80 |
| Thickness of hydrogel (μm) | 200 | 200 | 200 | 200 | 200 | 200 |
| Appearance assessment of electrolytic solution immersion test | ○ | ○ | ○ | ○ | ○ | x |

From Table 3, it can be seen that the hydrogels of Examples 1a to 5a are sheets that do not cause warping or winding, and are good in handleability.

Example 1b 20 parts by mass of 2-acrylamide-2-methylpropanesulfonic acid (product name: TBAS, manufactured by MCC UNITEC Co., Ltd.), 0.3 part by mass of sodium divinylbenzensulfonate (product name: DVBS, manufactured by Tosoh Organic Chemical Co., Ltd.), and 54.6 parts by mass of ion-exchanged water were placed into a container, and the mixture was stirred. Furthermore, 25 parts by mass of a 20 mass % aqueous solution of Jurymer AC-10LP (manufactured by Toagosei Co., Ltd., polyacrylic acid, weight average molecular weight: 20,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. A silicon frame having the thickness of 2 mm was placed on a peelable PET film, the hydrogel precursor was poured into the frame, and thereafter, a peelable PET film was placed on the hydrogel precursor. Thereafter, a step of irradiating an ultraviolet ray at the energy of 7,000 mJ/cm² with a small UV polymerizer (manufactured by JATEC Co., Ltd., J-cure1500, metal halide lamp type name MJ-1500L) under the conditions of a conveyer speed of 0.4 m/min and an interwork distance of 150 mm was performed three times to thereby prepare a sheet-like hydrogel having the thickness of 2 mm. The prepared hydrogel was subjected to swelling degree measurement, a bending test after electrolytic solution immersion, a piercing test, and AC impedance measurement.

Example 2b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 67.1 parts by mass of ion-exchanged water were placed into a container, and the mixture was stirred. Furthermore, 12.5 parts by mass of a 20 mass % aqueous solution of Jurymer AC-10LP (manufactured by Toagosei Co., Ltd., polyacrylic acid, weight average molecular weight: 20,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 3b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 54.6 parts by mass of ion-exchanged water were placed into a container, and the mixture was stirred. Furthermore, 25 parts by mass of a 20 mass % aqueous solution of polyacrylic acid (manufactured by Wako Pure Chemical Industries, Ltd., polyacrylic acid, weight average molecular weight: 25,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 4b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 67.1 parts by mass of ion-exchanged water were placed into a container, and the mixture was stirred. Furthermore, 12.5 parts by mass of a 20 mass % aqueous solution of polyacrylic acid (manufactured by Wako Pure Chemical Industries, Ltd., polyacrylic acid, weight average molecular weight: 25,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 5b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 80 parts by mass of a 5 mass % aqueous solution of polyacrylic acid (manufactured by Wako Pure Chemical Industries, Ltd., polyacrylic acid, weight average molecular weight: 1,000,000) were added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 6b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), 39.6 parts by mass of ion-exchanged water, and 40 parts by mass of a 5 mass % aqueous solution of polyacrylic acid (manufactured by Wako Pure Chemical Industries, Ltd., polyacrylic acid, weight average molecular weight: 1,000,000) were added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 7b 15 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 54.6 parts by mass of ion-exchanged water were placed into a container, and the mixture was stirred. Furthermore, 25 parts by mass of a 20 mass % aqueous solution of Jurymer AC-10LP (manufactured by Toagosei Co., Ltd., polyacrylic acid, weight average molecular weight: 20,000) was added, the mixture was stirred, thereafter, 5 parts by mass of acrylic acid (manufactured by Nippon Shokubai Co., Ltd.) was added, and the mixture was stirred. To this solution was added 0.10 part by mass of Omnirad 1173 (manufactured by BASF Japan Ltd.) as a polymerization initiator, and the mixture was stirred to thereby prepare a hydrogel. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 8b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 29.6 parts by mass of ion-exchanged water were placed into a container, and the mixture was stirred. Furthermore, 50 parts by mass of a 20 mass % aqueous solution of Jurymer AC-10LP (manufactured by Toagosei Co., Ltd., polyacrylic acid, weight average molecular weight: 20,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 9b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 54.6 parts by mass of ion-exchanged water were placed into a container, and the mixture was stirred. Furthermore, 25 parts by mass of a 20 mass % aqueous solution of Aqualic DL453 (manufactured by Nippon Shokubai Co., Ltd., poly(sodium acrylate), weight average molecular weight: 50,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 10b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 68.7 parts by mass of ion-exchanged water were placed into a container, and the mixture was stirred. Furthermore, 10.9 parts by mass of Aqualic GH001 (manufactured by Nippon Shokubai Co., Ltd., 46 mass % aqueous solution of acrylic acid/sulfonic acid-based monomer copolymer, weight average molecular weight: 11,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 11b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 54.6 parts by mass of ion-exchanged water were placed into a container, and the mixture was stirred. Furthermore, 10.9 parts by mass of Aqualic GH003 (manufactured by Nippon Shokubai Co., Ltd., 46 mass % aqueous solution of acrylic acid/sulfonic acid-based monomer copolymer, weight average molecular weight: 11,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 10b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 12b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 54.6 parts by mass of ion-exchanged water were placed into a container, and the mixture was stirred. Furthermore, 10.9 parts by mass of Aqualic GL234 (manufactured by Nippon Shokubai Co., Ltd., 46 mass % aqueous solution of acrylic acid/sulfonic acid-based monomer copolymer Na, weight average molecular weight: 140,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 10b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Example 13b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 54.6 parts by mass of ion-exchanged water were placed into a container, and the mixture was stirred. Furthermore, 10.9 parts by mass of Aqualic GL366 (manufactured by Nippon Shokubai Co., Ltd., 46 mass % aqueous solution of acrylic acid/sulfonic acid-based monomer copolymer Na, weight average molecular weight: 6,000) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 10b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Comparative Example 1b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 79.6 parts by mass of ion-exchanged water were placed into a container, and the mixture was stirred. To this solution was added 0.1 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Comparative Example 2b 20 parts by mass of acrylic acid (manufactured by Nippon Shokubai Co., Ltd.), 0.3 part by mass of sodium divinylbenzenesulfonate (product name: DVBS, manufactured by Tosoh Organic Chemical Co., Ltd.), and 79.5 parts by mass of ion-exchanged water were placed into a container, and the mixture was stirred. To this solution was added 0.20 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Comparative Example 3b 5 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 79.5 parts by mass of ion-exchanged water were placed into a container, and the mixture was stirred. Furthermore, 15 parts by mass of acrylic acid (manufactured by Nippon Shokubai Co., Ltd.) was added, and the mixture was stirred. To this solution was added 0.2 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Comparative Example 4b 15 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 79.4 parts by mass of ion-exchanged water were placed into a container, and the mixture was stirred. Furthermore, 5 parts by mass of acrylic acid (manufactured by Nippon Shokubai Co., Ltd.) was added, and the mixture was stirred. To this solution was added 0.1 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Comparative Example 5b 10 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 54.6 parts by mass of ion-exchanged water were placed into a container, and the mixture was stirred. Furthermore, 50 parts by mass of a 20 mass % aqueous solution of Jurymer AC-10LP (manufactured by Toagosei Co., Ltd., polyacrylic acid, weight average molecular weight: 20,000) was added, the mixture was stirred, thereafter, 10 parts by mass of acrylic acid (manufactured by Nippon Shokubai Co., Ltd.) was added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Comparative Example 6b 20 parts by mass of 2-acrylamide-2-methylpropanesulfonic acid (product name: TBAS, manufactured by MCC UNITEC Co., Ltd.), 0.3 part by mass of sodium divinylbenzenesulfonate (product name: DVBS, manufactured by Tosoh Organic Chemical Co., Ltd.), and 80 parts by mass of a 25 mass % aqueous solution of Jurymer AC-10LP (manufactured by Toagosei Co., Ltd., polyacrylic acid, weight average molecular weight: 20,000) were added, and the mixture was stirred. To this solution was added 0.10 part by mass of Omnirad 1173 (manufactured by BASF Japan Ltd.) as a polymerization initiator, and the mixture was stirred to thereby prepare a hydrogel precursor. In the same manner as that of Example 1b except that this hydrogel precursor was used, a sheet-like hydrogel having the thickness of 2 mm was prepared. The prepared hydrogel was subjected to swelling degree measurement, a bending test after electrolytic solution immersion, a piercing test, and AC impedance measurement.

Results of Examples 1b to 13b and Comparative Examples 1b to 6b are shown in Tables 4 to 6.

TABLE 4

| | | | | Example | | | | | | | | |
|---|---|---|---|---|---|---|---|---|---|---|---|---|
| | | | | 1b | 2b | 3b | 4b | 5b | 6b | 7b | 8b | 9b |
| Constituents | Monofunctional monomer | 2-Acrylamide-2-methyl-propanesulfonic acid (TBAS) | Parts by mass (mol number/mmol) | 20 (96.5) | 20 (96.5) | 20 (96.5) | 20 (96.5) | 20 (96.5) | 20 (96.5) | 15 (72.4) | 20 (96.5) | 20 (96.5) |
| | | Acrylic acid | | — | — | — | — | — | — | 5 (69.4) | — | — |
| | Polyfunctional monomer | Sodium divinylbenzene-sulfonate | Parts by mass | 0.3 | 0.3 | 0.3 | 0.3 | 0.3 | 0.3 | 0.3 | 0.3 | 0.3 |
| | Polyacrylic acid homopolymer | Jurymer AC-10LP, polyacrylic acid weight average molecular weight 20,000 | Parts by mass | 5 | 2.5 | — | — | — | — | 5 | 10 | — |
| | | Wako Pure Chemical Industries, Ltd., polyacrylic acid weight average molecular weight 25,000 | | — | — | 5 | 2.5 | — | — | — | — | — |
| | | Aqualic DL453, poly(sodium acrylate) weight average molecular weight 50,000 | | — | — | — | — | — | — | — | — | 5 |
| | | Wako Pure Chemical Industries, Ltd., polyacrylic acid weight average molecular weight 1,000,000 | | — | — | — | — | 4 | 2 | — | — | — |
| | Polymerization initiator | Omnirad 1173 | Parts by mass | 0.1 | 0.1 | 0.1 | 0.1 | 0.1 | 0.1 | 0.1 | 0.1 | 0.1 |
| | Water | | Parts by mass | 74.6 | 77.1 | 74.6 | 77.1 | 75.6 | 77.6 | 75.6 | 69.6 | 74.6 |
| Assessment | Swelling degree with 1.5M LiOH/10M LiCl-containing aqueous solution (%) | | | 132 | 179 | 131 | 171 | 102 | 134 | 171 | 102 | 174 |
| | Piercing test with 1.5M LiOH/10M LiCl-containing aqueous solution (N) | | | 1.29 | 0.58 | 1.87 | 0.64 | 5.175 | 1.97 | 1.45 | 5.175 | 1.179 |
| | Impedance at frequency 100 kHz (Ω) | | | 0.76 | 0.52 | 2.80 | 0.86 | 3.21 | 0.98 | 0.55 | 6.54 | 0.56 |
| | Impedance at frequency 1 kHz (Ω) | | | 0.76 | 0.54 | 3.86 | 1.23 | 4.69 | 1.86 | 0.58 | 10.52 | 0.58 |
| | Bending test after electrolytic solution immersion (softness assessment) | | | ○ | ○ | ○ | ○ | ○ | ○ | ○ | ○ | ○ |

TABLE 5

| | | | | Example | | | |
|---|---|---|---|---|---|---|---|
| | | | | 10b | 11b | 12b | 13b |
| Constituents | Monofunctional monomer | 2-Acrylamide-2-methyl-propanesulfonic acid (TBAS) | Parts by mass (mol number/mmol) | 20 (96.5) | 20 (96.5) | 20 (96.5) | 20 (96.5) |
| | Polyfunctional monomer | Sodium divinylbenzene-sulfonate | Parts by mass | 0.3 | 0.3 | 0.3 | 0.3 |
| | Acrylic acid/sulfonic acid-based copolymer | Aqualic GH003, acrylic acid/sulfonic acid-based copolymer weight average molecular weight 11,000 | Parts by mass | — | 5 | — | — |
| | | Aqualic GL234, acrylic acid/sulfonic acid-based copolymer weight average molecular weight 140,000 | | — | — | 5 | — |
| | | Aqualic GL366, acrylic acid/sulfonic acid-based copolymer weight average molecular weight 6,000 | | — | — | — | 5 |
| | | Aqualic GH001, acrylic acid/sulfonic acid-based copolymer weight average molecular weight 11,000 | | 5 | — | — | — |

TABLE 5-continued

|  |  |  | | Example | | | |
|---|---|---|---|---|---|---|---|
|  |  |  | | 10b | 11b | 12b | 13b |
|  | Polymerization initiator | Omnirad 1173 | Parts by mass | 0.1 | 0.1 | 0.1 | 0.1 |
|  | Water |  | Parts by mass | 74.6 | 74.6 | 74.6 | 74.6 |
| Assessment | Swelling degree with 1.5M LiOH/10M LiCl-containing aqueous solution (%) | | | 240 | 255.3 | 248.2 | 245.2 |
|  | Piercing test with 1.5M LiOH/10M LiCl-containing aqueous solution (N) | | | 1.181 | 2.974 | 0.882 | 0.846 |
|  | Impedance at frequency 100 kHz (Ω) | | | 0.52 | 0.51 | 0.53 | 0.51 |
|  | Impedance at frequency 1 kHz (Ω) | | | 0.55 | 0.53 | 0.56 | 0.53 |
|  | Bending test after electrolytic solution immersion (softness assessment) | | | ○ | ○ | ○ | ○ |

TABLE 6

|  |  |  | | Comparative Example | | | | | |
|---|---|---|---|---|---|---|---|---|---|
|  |  |  | | 1b | 2b | 3b | 4b | 5b | 6b |
| Constituents | Monofunctional monomer | 2-Acrylamide-2-methyl-propanesulfonic acid (TBAS) | Parts by mass | 20 (96.5) | — | 5 (24.1) | 15 (72.4) | 10 (48.2) | 20 (96.5) |
|  |  | Acrylic acid | (mol number/mmol) | — | 20 (277.5) | 15 (208.2) | 5 (69.4) | 10 (138.7) | — |
|  | Polyfunctional monomer | Sodium divinylbenzenesulfonate | Parts by mass | 0.3 | 0.3 | 0.3 | 0.3 | 0.3 | 0.3 |
|  | Polyacrylic acid homopolymer | Jurymer AC-10LP polyacrylic acid weight average molecular weight 20,000 | Parts by mass | — | — | — | — | 10 | 20 |
|  | Polymerization initiator | Omnirad 1173 | Parts by mass | 0.2 | 0.2 | 0.2 | 0.1 | 0.1 | 0.1 |
|  | Water |  | Parts by mass | 79.6 | 79.5 | 79.5 | 79.4 | 64.6 | 60 |
| Assessment | Swelling degree with 1.5M LiOH/10M LiCl-containing aqueous solution (%) | | | 421.1 | 45.2 | 57.8 | 322.2 | 67.2 | 75.6 |
|  | Piercing test with 1.5M LiOH/10M LiCl-containing aqueous solution (N) | | | 0.19 | 60 | 54 | 0.19 | 11.4 | 15.8 |
|  | Impedance at frequency 100 kHz (Ω) | | | 0.59 | 131.21 | 41.65 | 0.53 | 20.27 | 30.51 |
|  | Impedance at frequency 1 kHz (Ω) | | | 0.62 | 146.84 | 46.85 | 0.54 | 23.08 | 36.65 |
|  | Bending test after electrolytic solution immersion (softness assessment) | | | ○ | x | x | ○ | ○ | ○ |

From Tables 4 to 6, it can be seen that by inclusion of a polyacrylic acid-based polymer having a specific weight average molecular weight, there can be provided a hydrogel that has softness and high mechanical strength even under the environment of a high-concentration aqueous electrolytic solution.

In addition, an absorbance and an absorbance ratio of the polyacrylic acid-based polymers used in Examples 1b to 13b are shown in Table 7.

TABLE 7

|  |  | Absorbance | | Absorbance ratio |
|---|---|---|---|---|
|  |  | Absorbance$_{[1650 \pm 130\ cm-1]}$ | Absorbance$_{[1040 \pm 20\ cm-1]}$ | Absorbance$_{[1040 \pm 20\ cm-1]}$/Absorbance$_{[1650 \pm 130\ cm-1]}$ |
| Example | 1b, 2b, 7b, 8b | 0.366 | 0.0077 | 0.021 |
|  | 3b, 4b | 0.474 | 0.0056 | 0.012 |
|  | 5b, 6b | 0.453 | 0.0064 | 0.014 |
|  | 9b | 0.232 | 0.0040 | 0.017 |
|  | 10b | 0.141 | 0.0411 | 0.292 |

TABLE 7-continued

|  | Absorbance | | Absorbance ratio Absorbance$_{[1040\pm20\ cm-1]}$/ |
|---|---|---|---|
|  | Absorbance$_{[1650\pm130\ cm-1]}$ | Absorbance$_{[1040\pm20\ cm-1]}$ | Absorbance$_{[1650\pm130\ cm-1]}$ |
| 11b | 0.090 | 0.0527 | 0.584 |
| 12b | 0.0579 | 0.0582 | 1.006 |
| 13b | 0.351 | 0.1343 | 0.383 |

What is claimed is:

1. A hydrogel comprising water, a polymer matrix, and an electrolyte component, wherein
said polymer matrix comprises a copolymer of a monofunctional monomer having a hydrophilic group and one ethylenic unsaturated group, and a polyfunctional monomer having no ester bond, and having an amide group and 3 to 6 ethylenic unsaturated groups,
said monofunctional monomer is at least one selected from the group consisting of (meth)acrylic acid, sodium (meth)acrylate, potassium (meth) acrylate, lithium (meth)acrylate, vinylbenzoic acid, sodium vinylbenzoate, potassium vinylbenzoate, lithium vinylbenzoate, vinylacetic acid, sodium vinylacetate, potassium vinylacetate, lithium vinylacetate, vinylsulfonic acid, sodium vinylsulfonate, potassium vinylsulfonate, lithium vinylsulfonate, p-styrenesulfonic acid, sodium p-styrenesulfonate, potassium p-styrenesulfonate, lithium p-styrenesulfonate, allylsulfonic acid, sodium allylsulfonate, potassium allylsulfonate, lithium allylsulfonate, 2-acrylamide-2-methylpropanesulfonic acid, sodium 2-acrylamide-2-methylpropanesulfonate, potassium 2-acrylamide-2-methylpropanesulfonate, and lithium 2-acrylamide-2-methylpropanesulfonate,
said polyfunctional monomer is at least one selected from the group consisting of N,N'-{[(2-acrylamide-2-[(3-acrylamidopropoxy) methyl]propan-1,3-diyl] bis (oxy)]bis(propan-1,3-diyl)}diacrylamide, N,N',N'''-triacryloyldiethylenetriamine, and N,N',N'',N'''-tetraacryloyltriethylenetetramine,
40 to 95 parts by mass of said water, and 5 to 60 parts by mass of said polymer matrix are contained in 100 parts by mass of said hydrogel,
said hydrogel shows a swelling degree of 650% or less, when the hydrogel is immersed in a 4M aqueous KOH solution under a temperature of 25° C. for 14 days,
said electrolyte component is at least one selected from the group consisting of sodium hydroxide, potassium hydroxide, calcium hydroxide, barium hydroxide, lithium hydroxide, rubidium hydroxide, cesium hydroxide, lithium fluoride, lithium chloride, lithium bromide, lithium iodide, sodium chloride, sodium bromide, potassium chloride, potassium bromide, and calcium chloride, and
said hydrogel does not comprise a gel strength improving agent.

2. The hydrogel according to claim 1, wherein said copolymer comprises 100 parts by mass of a unit derived from said monofunctional monomer, and 0.1 to 5 parts by mass of a unit derived from said polyfunctional monomer.

3. The hydrogel according to claim 1, wherein when said hydrogel is immersed in a 4M aqueous KOH solution saturated with zinc oxide, and thereafter, is subjected to a direct current polarization test in which a direct current at 1 mA/cm$^2$ is passed between zinc electrode plates, in a state of being positioned between said zinc electrode plates at an interval of 200 μm, said hydrogel shows an energization time of 700 minutes or longer.

4. The hydrogel according to claim 1, wherein when said hydrogel is immersed in a 4M aqueous KOH solution saturated with zinc oxide, and thereafter, is subjected to a direct current polarization test in which a direct current at 1 mA/cm$^2$ is passed between zinc electrode plates, in a state of being positioned between said zinc electrode plates at an interval of 200 μm, said hydrogel shows a voltage of 2.0 to 15 mV per 1 cm$^2$ of a zinc electrode plate, when 40 minutes passed from energization initiation.

5. A gel-like electrolyte comprising the hydrogel according to claim 1.

6. A separator comprising the hydrogel according to claim 1.

7. An alkaline battery comprising the hydrogel according to claim 1.

* * * * *